United States Patent
Imafuku

(10) Patent No.: US 9,529,119 B2
(45) Date of Patent: Dec. 27, 2016

(54) METHOD FOR FABRICATING SILICONE-CONTAINING COPOLYMER MOLDED ARTICLE HAVING HYDROPHILIC SURFACE AND SILICONE-HYDROGEL CONTACT LENS HAVING HYDROPHILIC SURFACE

(71) Applicant: HOYA CORPORATION, Tokyo (JP)

(72) Inventor: Suguru Imafuku, Gunma (JP)

(73) Assignee: HOYA CORPORATION, Tokyo (JP)

( * ) Notice: Subject to any disclaimer, the term of this patent is extended or adjusted under 35 U.S.C. 154(b) by 198 days.

(21) Appl. No.: 14/394,360

(22) PCT Filed: Jan. 21, 2014

(86) PCT No.: PCT/JP2014/051031
§ 371 (c)(1),
(2) Date: Oct. 14, 2014

(87) PCT Pub. No.: WO2015/001811
PCT Pub. Date: Jan. 8, 2015

(65) Prior Publication Data
US 2016/0282516 A1    Sep. 29, 2016

(30) Foreign Application Priority Data
Jul. 2, 2013 (JP) ................... 2013-138880

(51) Int. Cl.
*G02C 7/00* (2006.01)
*G02C 7/02* (2006.01)
(Continued)

(52) U.S. Cl.
CPC ............. *G02B 1/043* (2013.01); *B29C 39/006* (2013.01); *B29C 39/02* (2013.01);
(Continued)

(58) Field of Classification Search
CPC ........... G02B 1/043; G02C 7/04; G02C 7/048; G02C 7/02
(Continued)

(56) References Cited

U.S. PATENT DOCUMENTS 4,139,692 A     2/1979  Tanaka et al.
2007/0296914 A1  12/2007 Hong et al.
(Continued)

FOREIGN PATENT DOCUMENTS

CN    101473263 A    7/2009
CN    102964532 A    3/2013
(Continued)

OTHER PUBLICATIONS

European search report issued with respect to application No. 14777483.0, mail date is Jul. 20, 2015.
(Continued)

*Primary Examiner* — James Greece
(74) *Attorney, Agent, or Firm* — Greenblum & Bernstein, P.L.C.

(57) ABSTRACT

A method permits the fabrication of a silicone-containing copolymer molded article having a hydrophilic surface by cast molding and without employing a high-molecular-weight hydrophilic polymer even when employing a polypropylene mold. The method polymerizes a monomer solution containing a silicone monomer having a (meth)acryloyl group; a hydrophilic monomer having a vinyl group; a crosslinkable monomer; and a polymerization initiator in a cavity of a mold having a hydrophobic cavity surface. The polymerization initiator has a 10-hour half-life temperature of 70° C. or higher and 100° C. or lower, and the polymerization is conducted by maintaining a temperature within a range of from the temperature of the polymerization initiator contained in the monomer solution to 35° C. below (Continued)

the temperature for one hour or more; and maintaining a temperature higher than the temperature of the polymerization initiator contained in the monomer solution for one hour or more.

31 Claims, 5 Drawing Sheets

(51) Int. Cl.

| | | |
|---|---|---|
| G02C 7/04 | (2006.01) | |
| G02B 1/04 | (2006.01) | |
| B29D 11/00 | (2006.01) | |
| B29C 39/00 | (2006.01) | |
| B29C 39/02 | (2006.01) | |
| C08F 226/08 | (2006.01) | |
| C08F 218/04 | (2006.01) | |
| B29K 83/00 | (2006.01) | |
| B29L 11/00 | (2006.01) | |

(52) U.S. Cl.
CPC .. *B29D 11/00067* (2013.01); *B29D 11/00134* (2013.01); *C08F 218/04* (2013.01); *C08F 226/08* (2013.01); *G02C 7/049* (2013.01); *B29K 2083/00* (2013.01); *B29L 2011/0016* (2013.01); *C08F 2800/20* (2013.01)

(58) Field of Classification Search
USPC .................... 351/159.01, 159.02, 159.33, 351/159.73, 159.74
See application file for complete search history.

(56) References Cited

U.S. PATENT DOCUMENTS

| | | |
|---|---|---|
| 2010/0120939 A1 | 5/2010 | Phelan |
| 2011/0008403 A1* | 1/2011 | Nakamura et al. ........... 424/411 |
| 2012/0148519 A1 | 6/2012 | Satake et al. |
| 2012/0219387 A1 | 8/2012 | Atkinson et al. |
| 2012/0220689 A1 | 8/2012 | Yao et al. |
| 2013/0031813 A1 | 2/2013 | Ishikawa et al. |
| 2013/0155370 A1* | 6/2013 | Zhang et al. ............ 351/159.33 |

FOREIGN PATENT DOCUMENTS

| | | |
|---|---|---|
| JP | H04-323212 A | 11/1992 |
| JP | H05-127134 A | 5/1993 |
| JP | H07-505169 A | 6/1995 |
| JP | H10-147609 A | 6/1998 |
| JP | 2008-020918 A | 1/2008 |
| JP | 2008-083649 A | 4/2008 |
| JP | 2010-510550 A | 4/2010 |
| JP | 2011-153304 A | 8/2011 |
| JP | 2011-219512 A | 11/2011 |
| JP | 2012-118198 A | 6/2012 |
| WO | 2007/146300 A2 | 12/2007 |
| WO | 2011/041523 A2 | 4/2011 |
| WO | 2012-006485 A2 | 1/2012 |
| WO | 2012-016152 A1 | 2/2012 |
| WO | 2012-118680 A1 | 9/2012 |

OTHER PUBLICATIONS

International search report issued with respect to application No. PCT/2014/051031, mail date is Apr. 22, 2014.
Office action issued with respect to Japanese application No. 2013-138880, mail date is Sep. 17, 2013.
Notice of allowance issued with respect to Japanese application No. 2013-138880, mail date is Dec. 16, 2013.
English translation of the Written Opinion of the International Searching Authority for PCT/JP2014/051031, mailed Jan. 7, 2015.
European Search report issued with respect to application No. 15163829.3, mail date is Jul. 24, 2015.
Database WPI Week 201377, Thompson Scientific, London, GB, 2013.
Written Opinion and Search Report issued in the corresponding Singapore Patent Application No. 11201406616U, dated Sep. 21, 2016.
Chinese Office Action issued with respect to application No. 201480000965.9, dated Oct. 8, 2016.

\* cited by examiner

METHOD FOR FABRICATING SILICONE-CONTAINING COPOLYMER MOLDED ARTICLE HAVING HYDROPHILIC SURFACE AND SILICONE-HYDROGEL CONTACT LENS HAVING HYDROPHILIC SURFACE

The present invention relates to a method for fabricating a silicone-containing copolymer molded article having a hydrophilic surface and to a silicone hydrogel contact lens having a hydrophilic surface.

BACKGROUND ART

When wearing contact lenses, the amount of oxygen supplied to the surface of the eye from the air decreases. Clinical results have linked this to inhibited mitosis of corneal epithelial cells and corneal thickening. Accordingly, to achieve a highly safe contact lens, attempts have been made to improve the oxygen permeability of contact lens materials (also referred to simply as "materials" hereinafter).

Since the materials in hydrated soft contact lenses are soft, such lenses are generally known to be quite comfortable to wear. However, the oxygen permeability of conventional lenses depends on the water content of the lens. Thus, attempts have been made to increase the water content of the materials. However, there is a limit to how much the oxygen permeability can be enhanced by simply increasing the water content of the materials. Accordingly, silicone hydrogels, obtained by polymerizing monomers such as silicone monomers and siloxane macromonomers, have recently been developed as a method of increasing oxygen permeability independently of the water content. These have also been developed into lens products.

Since uniform products can be manufactured in large quantities, the cast molding manufacturing method is generally employed to manufacture soft contact lenses. Polypropylene is often employed as the material of the mold used in the cast mold manufacturing method because of low cost and ease of molding. However, polypropylene is itself a hydrophobic material. Thus, when manufacturing a silicone-containing copolymer using a mold made of polypropylene, the hydrophobic monomer ends up orienting toward the portion coming into contact with the mold surface. Thus the surface of the lens comprised of copolymer that is obtained exhibits a highly hydrophobic property.

When the lens surface exhibits a hydrophobic property, the lipid component of tears tends to adhere. Thus, noticeable symptoms tend to occur, such as lens fogging and difficulty seeing while wearing contact lenses. Alternatively, proteins and the like further adhere over the lipid component that has attached, potentially causing eye disease. Thus, in silicone-containing copolymers, after polymerizing the lens, imparting a hydrophilic property by a plasma treatment or graft polymerization is known. However, such post-processing is undesirable as a method of mass production because of the number and complexity of the steps required to impart a hydrophilic property to the surface.

In addition to the method of imparting a hydrophilic property by graft polymerization or plasma processing, there is the method of incorporating a high-molecular-weight hydrophilic polymer into the material as an internal moisturizer. This method yields a material containing a high-molecular-weight hydrophilic polymer by polymerizing a polymerization solution obtained by dissolving a high-molecular-weight hydrophilic polymer such as polyvinyl pyrrolidone. The surface of the material that is obtained by this method exhibits a hydrophilic property without a plasma treatment or graft polymerization.

Generally, unpolymerized monomer and oligomer will remain in a polymer obtained by polymerizing a mixed monomer solution. When such a monomer or oligomer elutes out of a lens that is being worn, it may irritate the eye. Thus, alcohol or an alcohol aqueous solution is generally used following polymerization to extract the monomer or oligomer from the polymer. The higher the concentration of the alcohol used in the extraction, the better the extraction efficiency and the more unpolymerized monomer and oligomer that can be removed in a short period. However, the above high-molecular-weight hydrophilic polymer for imparting a hydrophilic property is simply physically entwined in the network structure of the polymer. Thus, when alcohol or a highly concentrated alcohol aqueous solution is used for extraction over an extended period, the high-molecular-weight hydrophilic polymer is extracted from the polymer along with the unreacted monomer or polymer. As a result, it becomes difficult to maintain a good hydrophilic property following extraction.

There is also the method of manufacturing contact lenses with molds of materials other than polypropylene. For example, the use of molds that are molded out of resins having a coefficient of water absorption falling within a range of 0.01 to 0.15 mass percent in the form of cast polymerization resin molds with surfaces having water contact angles falling within a range of 65 to 80 degrees is known. With this method, it becomes possible to manufacture a contact lens with good surface water-wettability because the hydrophilic monomer tends to orient with the portion coming into contact with the mold. However, this method cannot be considered to be a good method. The reason for this is that since the coefficient of water absorption of the constituent resin is high in a resin mold, shape stability following molding is poor or it becomes difficult to look for molding conditions achieving an accurate resin mold.

In light of these circumstances, various methods have been proposed that employ the hydrophilic monomers comprising vinyl groups that are widely employed as starting materials in contact lenses, such as N-vinyl-2-pyrrolidone and N-methyl-N-vinyl acetamide, with the goal of readily improving the hydrophobic property of the surface of soft contact lenses employing silicone-containing copolymers.

WO93/09154 (Japanese Translated PCT Patent Application Publication (TOKUHYO) Heisei No. 7-505169) (Patent Reference 1) discloses a silicone-containing hydrogel obtained by curing a mixed monomer solution obtained by combining at least one vinyl-containing monomer, at least one acrylic-containing monomer, and at least one silicone-containing prepolymer. Examples of the at least one vinyl-containing monomer are N-vinyl-2-pyrrolidone and N-methyl-N-vinylacetamide.

Japanese Unexamined Patent Publication (KOKAI) No. 2011-219512 (Patent Reference 2) discloses a polymerizable composition comprising monomers in the form of: [A] a polymerizable compound containing an acryloyloxy group and not containing silicon atoms, in which the glass transition temperature as a homopolymer is 10° C. or less; [B] a silicone compound containing a polymerizable group; and [C] an N-vinyl pyrrolidinone.

WO2008/061992 (Japanese Translated PCT Patent Application Publication (TOKUHYO) No. 2010-510550) (Patent Reference 3) discloses a silicone-containing copolymer obtained by polymerizing a polymer solution comprising components in the form of: [A] the silicone-containing monomer denoted by general formula I; [B] 3-methacryloyloxypropyltris(trimethylsiloxy)silane; [C] N-vinylpyrrolidone; and [D] at least one additional nonionic hydrophilic monomer.

WO2012/118680 (Patent Reference 4) discloses a silicone-containing copolymer obtained by polymerizing a solution containing: (a) the silicone monomer having a polyethylene glycol group denoted by general formula (I); (b) at least one hydrophilic monomer comprising a vinyl group; and (c) a crosslinking agent having a vinyl group.

US2013/0031873 A1 (Patent Reference 5) discloses a method for manufacturing a silicone-containing copolymer using a mold comprised of a nonpolar resin. The materials used to prepare the lens are described as being a polymerizable silicone monomer and nonsilicone monomer, with the nonsilicone monomer being a monomer having a vinyl group such as N-vinylpyrrolidone or N-vinyl-N-methylacetamide.

SUMMARY OF THE INVENTION

In Patent Reference 1, N,N-dimethylacrylamide, widely employed as an amphiphilic monomer having dual characteristics in the form of both hydrophilic and lipophilic properties, is employed in addition to N-vinyl-2-pyrrolidone or N-methyl-N-vinyl acetamide. The N,N-dimethylacrylamide exhibits good solubility in silicone monomers, making it possible to prepare a homogenous monomer mixture; it is thus widely employed as one of the constituent components of silicone-containing copolymers. However, N,N-dimethyl acrylamide imparts a lipophilic property to the surface of the copolymer following polymerization. As a result, the water wettability of the lens following hydration deteriorates, and surface water repellence is exhibited, which are undesirable. (See the reproduction test results given in Comparative Example 9 of the present application.)

In the method described in Patent Reference 2, component [A] performs the function of enhancing the compatibility of the silicone compound of component [B] and the N-vinylpyrrolidinone of component [C]. However, since component [A] has a poor hydrophilic property and since the TRIS (tris(trimethylsiloxy)silylpropylmethacrylate) employed in the embodiments as the silicone compound of component [B] contains neither a hydroxyl group nor a polyethylene glycol group in its molecular structure, the surface of the lens obtained exhibits a highly water-repellent property. As a result, the polymer obtained cannot be readily employed as a contact lens without post-processing such as a plasma treatment or graft treatment (see the results of the reproduction test given in Comparative Example 10 of the present application).

The monomers of (A) and (B) that are employed in the method described in Patent Reference 3 are silicone monomers that do not contain hydroxyl groups or polyethylene glycol in their molecular structures. These silicone monomers exhibit a highly hydrophobic property, and can thus not be used to obtain homogeneous monomer mixtures with N-vinyl pyrrolidone. As a result, a homogeneous mixed monomer liquid is prepared by adding a solvent. However, when a solvent is added to a mixed monomer solution, it becomes necessary to remove not just the unpolymerized monomer following polymerization, but also the solvent employed. As a result, this method is undesirable not only because it renders the manufacturing process complex, but also due to the impact on the environment.

A silicone monomer comprising a polyethylene glycol group is disclosed as general formula (I) in Patent Reference 4. However, the only monomer employed in the embodiments is (Si-1), with a siloxane group repeat number m of 4 and an ethylene glycol group repeat number n of 1. Since this monomer only has an ethylene glycol group repeat number of 1, there are few hydrophilic moieties in the silicone monomer structure. As a result, there is inadequate solubility with the monomer having the vinyl group. Subsequently, the silicone component cannot be used in a high blending proportion, making it difficult to achieve high oxygen permeability.

The embodiments of Patent Reference 5 disclose compositions comprising lens structural components in the form of a silicone monomer (SIGMA) containing a hydroxyl group in its molecular structure and N-vinyl pyrrolidone (NVP) (Examples 25, 26, 27, 28, 33, 43, 53, 55, 56). However, solvents such as propanol, decanol, and hexanol are added to each of these compositions. As a result, not just the unpolymerized monomer, but also the solvent employed, must be removed following polymerization. This renders the method undesirable not only by rendering the manufacturing process complex, but also in terms of environmental impact.

The present invention has for its object to provide a method permitting the fabrication of a silicone-containing copolymer molded article having a hydrophilic surface by means of the cast molding method, without employing a high-molecular-weight hydrophilic polymer and without requiring post-processing to improve the water wettability of the surface of the lens-shaped polymer following polymerization even when employing a polypropylene mold. A further object is to provide a silicone hydrogel contact lens having a hydrophilic surface, obtained without using a high-molecular-weight hydrophilic polymer and without requiring post-processing to improve the water wettability of the surface of the lens-shaped polymer following polymerization, even when employing a polypropylene mold.

MEANS OF SOLVING THE PROBLEM

[1]

A method for fabricating a silicone-containing copolymer molded article comprising a silicone monomer unit, hydrophilic monomer unit, and crosslinking monomer unit, and having a hydrophilic surface;

by polymerizing a monomer solution containing (a) at least one silicone monomer comprising a (meth)acryloyl group; (b) at least one hydrophilic monomer comprising a vinyl group; (c) at least one crosslinkable monomer; and (d) at least one polymerization initiator;

in a cavity of a mold having a hydrophobic cavity surface;

wherein the polymerization initiator has a 10-hour half-life temperature (abbreviated to T10 hereinafter) of 70° C. or higher and 100° C. or lower, and the polymerization is conducted by means of a step P1 of maintaining a temperature within a range of from the T10 of the polymerization initiator contained in the monomer solution to 35° C. below T10 for one hour or more; and a step P2 of maintaining a temperature higher than the T10 of the polymerization initiator contained in the monomer solution for one hour or more.

[2]

The method according to [1], wherein the temperature maintained in step P1 is in a temperature range of from a temperature 10° C. lower than T10 to a temperature 35° C. lower than T10.

[3]
The method according to [1] or [2] wherein the temperature maintained in step P2 is in a temperature range of from a temperature 5° C. higher than T10 to a temperature 50° C. higher than T10.

[4]
The method according to any one of [1] to [3], wherein the polymerization initiator is an azo polymerization initiator or an organic peroxide polymerization initiator.

[5]
The method according to any one of [1] to [4], wherein the content of silicone monomer (a) units in the silicon-containing copolymer molded article is in a range of 20 to 56 mass %, the content of hydrophilic monomer (b) units is in a range of 40 to 60 mass %, and the content of crosslinkable monomer (c) units is in a range of 0.02 to 4 mass %.

[6]
The method according to any one of [1] to [5], wherein silicone monomer (a) is at least one monomer selected from the group consisting of (a1) and (a2) below:
(a1) one or two or more silicone monomers containing at least one hydroxyl group and 1 to 4 silicon atoms per molecule; and
(a2) one or two or more silicone monomers containing at least one polyethylene glycol group and 1 to 4 silicon atoms per molecule.

[7]
The method according to [6], wherein silicone monomer (a1) is a monomer denoted by general formula (a1-1) or (a1-2) below:

[Chem. 1]

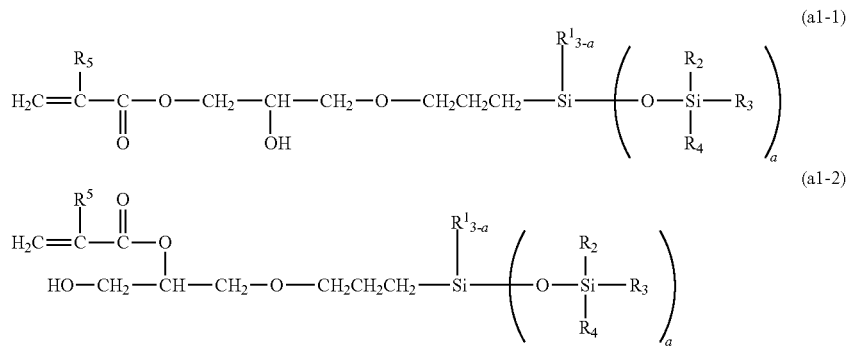

(wherein $R^1$, $R^2$, $R^3$, and $R^4$ denote methyl groups, $R^5$ denotes a hydrogen atom or a methyl group, and a denotes an integer of from 1 to 3) and silicone monomer (a2) is a monomer denoted by general formula (a2-1) below:

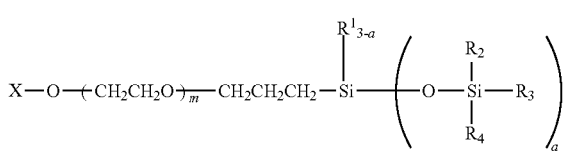

(wherein $R^1$, $R^2$, $R^3$, and $R^4$ denote methyl groups, a denotes an integer of from 1 to 3, m is 4 to 8, and X denotes one substituent selected from the substituents denoted by formula (Y1) or (Y2) below (wherein $R^5$ is a hydrogen atom or a methyl group))

[Chem. 3]

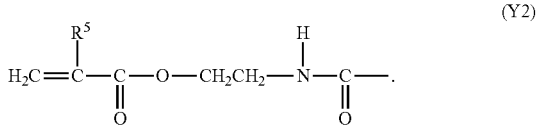

[8]
The method according to any one of [1] to [7], wherein hydrophilic monomer (b) is either one, or both, of N-vinyl-2-pyrrolidone and N-vinyl-N-methylacetamide.

[9]
The method according to any one of [1] to [8], wherein the crosslinkable monomer (c) is at least one monomer selected from the group consisting of (c1), (c2), and (c3):
(c1) one or two or more monomers containing two or more vinyl groups per molecule;
(c2) one or two or more monomers containing two or more allyl groups per molecule; and
(c3) one or two or more monomers containing two or more (meth)acrylate groups per molecule.

[10]
The method according to [9], wherein the monomer (c1) is one or two or more members selected from the group consisting of 1,4-butanediol divinyl ether, diethylene glycol divinyl ether, and triethylene glycol divinyl ether;
the monomer (c2) is one or two or more members selected from the group consisting of triallyl isocyanurate, trimethylol propane diallyl ether, and pentaerythritol triallyl ether; and
the monomer (c3) is one or two or more monomers selected from the group consisting of ethylene glycol di(meth)acrylate, triethylene glycol di(meth)acrylate, tetraethylene glycol di(meth)acrylate, trimethylol propane tri(meth)acrylate, and ethoxylated trimethylol propane tri(meth)acrylate.

[11]

The method according to any one of [1] to [10], wherein the monomer solution further contains at least one supplemental monomer selected from the group consisting of siloxane macromonomers, silicone monomers not containing hydroxyl groups or polyethylene glycol groups in the molecular structures thereof, and monomers not containing silicon atoms in the molecular structures thereof.

[12]

The method according to any one of [1] to [11], wherein the hydrophilic surface of the silicone-containing copolymer molded article exhibits a contact angle of 60° or less relative to pure water without the surface of the molded article having been subjected to post-processing to enhance the water wettability of the surface following polymerization, wherein the contact angle is the contact angle of a silicone hydrogel molded article obtained by hydrating the silicone-containing copolymer molded article.

[13]

The method according to any one of [1] to [12], wherein the mold having a hydrophobic cavity surface is a two-sided casting mold for use in polyalkylene contact lens molding and the silicone-containing copolymer molded article is a precursor for silicone hydrogel soft contact lens.

[14]

A silicone-containing copolymer molded article prepared by the method according to any one of [1] to [13].

[15]

A silicone-containing copolymer molded article comprised of at least one monomer unit selected from the group consisting of (a1) and (a2), a monomer unit (b), and at least one monomer unit selected from the group consisting of (c1) to (c3) below, wherein molecular structure (g) may further contain monomer units not containing silicon atoms, wherein the monomers not containing silicon atoms in molecular structure (g) are one or more monomers selected from among 2-hydroxyethyl (meth)acrylate, methacrylic acid, methyl (meth)acrylate, ethyl (meth)acrylate, n-butyl (meth)acrylate, 2-methoxyethyl (meth)acrylate, and 2-methacryloyloxyethyl phosphorylcholine); having a hydrophilic surface with a contact angle relative to pure water of 60°, wherein the contact angle is the contact angle of a silicone hydrogel molded article obtained by hydrating a silicone-containing copolymer molded article; wherein the content of silicone monomers (a1) and (a2) units is in a range of 20 to 56 mass %, the content of monomer (b) units is in a range of 40 to 60 mass %, and the content of monomers (c1) to (c3) units is in a range of 0.02 to 4 mass %, and the content of the monomer units not containing silicon atoms in molecular structure (g) is in a range of less than 10 mass %:

(a1) one or two or more units derived from silicone monomers containing at least one hydroxyl group and 1 to 4 silicon atoms per molecule, and having a molecular weight of less than 900;

(a2) one or two or more silicone monomer units containing at least one polyethylene glycol group and 1 to 4 silicon atoms per molecule, and having a molecular weight of less than 900;

(b) one or two or more units derived from hydrophilic monomers having a vinyl group;

(c1) one or two or more monomer units containing two or more vinyl groups per molecule;

(c2) one or two or more monomer units containing two or more allyl groups per molecule; and (c3) one or two or more monomers having two or more (meth)acrylate groups per molecule.

[16]

A silicone-containing copolymer molded article, comprising at least one monomer unit selected from the group consisting of (a1) and (a2) below, monomer unit (b) below, at least one monomer selected from the group consisting of (c1) to (c3), and the siloxane macromonomer unit denoted by (e); having a hydrophilic surface with a contact angle of 60° or less relative to pure water; and having a water content of 35% or greater but less than 60%, wherein the contact angle and water content are the contact angle and water content of a silicone hydrogel molded article obtained by hydrating the silicone-containing copolymer molded article:

(a1) one or two or more units derived from silicone monomers containing at least one hydroxyl group and 1 to 4 silicon atoms per molecule, and having a molecular weight of less than 900;

(a2) one or two or more silicone monomer units containing at least one polyethylene glycol group and 1 to 4 silicon atoms per molecule, and having a molecular weight of less than 900;

(b) one or two or more units derived from hydrophilic monomers having a vinyl group;

(c1) one or two or more monomer units containing two or more vinyl groups per molecule;

(c2) one or two or more monomer units containing two or more allyl groups per molecule;

(c3) one or two or more monomers having two or more (meth)acrylate groups per molecule; and (e) one or two or more macromonomers of general formula (C1) and (C2);

[Chem. 4]

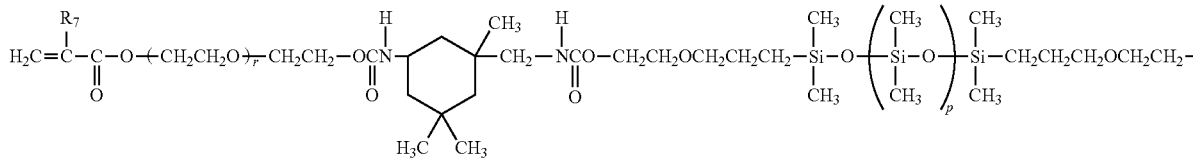

(C1)

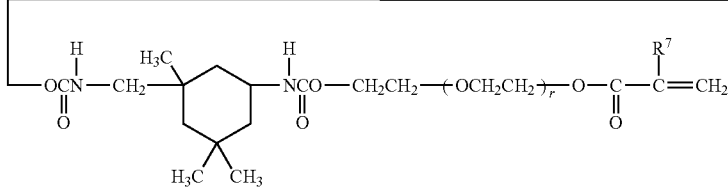

where in formula C1, $R^7$ denotes a hydrogen atom or a methyl group; r denotes 0 to 10; and p denotes 8 to 60; and where in formula C2, $R^8$ denotes a hydrogen atom or a methyl group, q denotes 9 to 15, and t denotes 0 to 3.

[17] The silicone-containing copolymer molded article according to [16] wherein r is 0 to 8, p is 8 to 50, q is 9 to 13, and t is 0 to 2.

[Chem. 5]

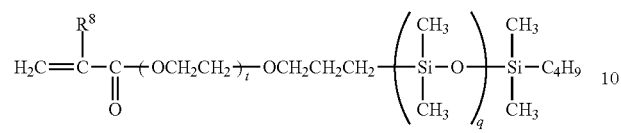

(C2)

[18] The silicone-containing copolymer molded article according to [16] wherein the siloxane macromonomer unit denoted by (e) is (E5) or (E6) below:

[Chem. 6]

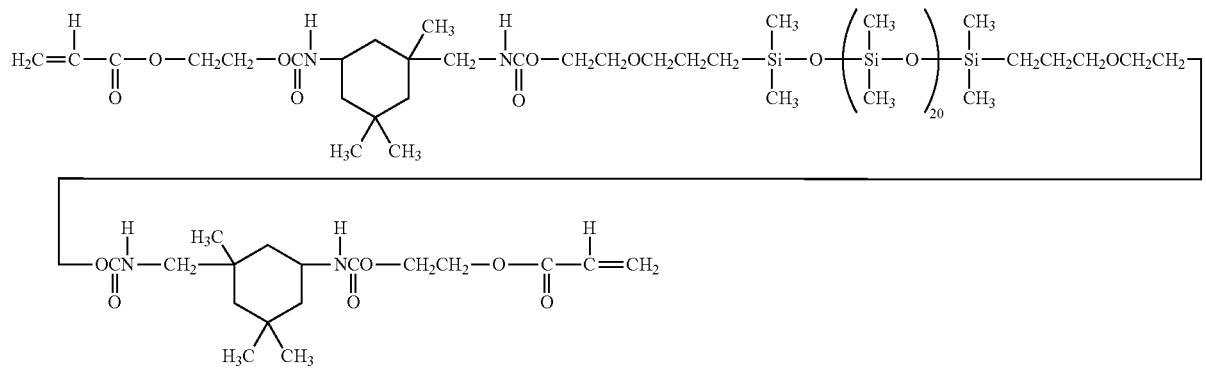

(E5)

Macromer A

[Chem. 7]

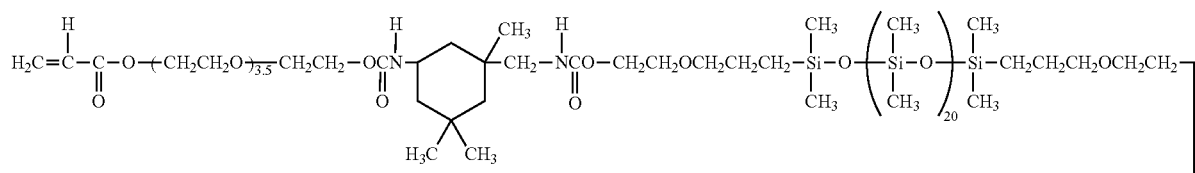

(E6)

Macromer B

[19] The silicone-containing copolymer molded article according to any one of [15] to [18], wherein silicone monomer (a1) is a monomer denoted by general formula (a1-1) or (a1-2):

[Chem. 8]

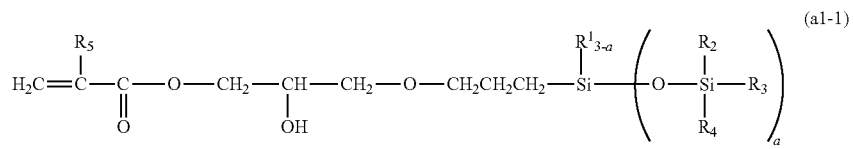

(a1-1)

-continued

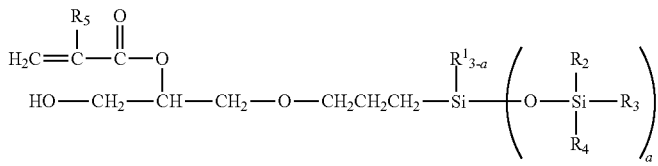

(a1-2)

(wherein $R^1$, $R^2$, $R^3$, and $R^4$ denotes methyl groups, $R^5$ denotes a hydrogen atom or methyl group, and a denotes an integer of 1 to 3) and silicone monomer (a2) is a monomer denoted by general formula (a2-1) below:

[Chem. 9]

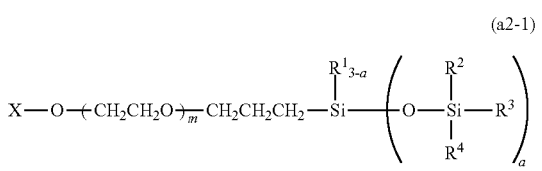

(a2-1)

(wherein $R^1$, $R^2$, $R^3$, and $R^4$ denote methyl groups, a denotes an integer of from 1 to 3, m denotes 4 to 8, the X in the equation denotes a substituent selected from the substituents denoted by formulas (Y1) and (Y2) below (wherein $R^5$ denotes a hydrogen atom or a methyl group)):

[Chem. 10]

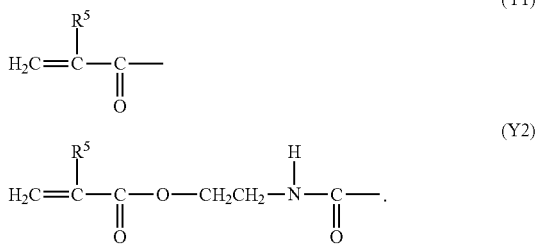

[20]

The silicone-containing copolymer molded article according to any one of [15] to [19], wherein hydrophilic monomer (b) is either N-vinyl-2-pyrrolidone or N-vinyl-N-methyl acetamide, or both.

[21]

The silicone-containing copolymer molded article according to any one of [15] to [20], wherein monomer (c1) is one or two or more selected from among 1,4-butanediol divinyl ether, diethylene glycol divinyl ether, and triethylene glycol divinyl ether;

monomer (c2) is one or two or more selected from among triallyl isocyanurate, trimethylol propane diallyl ether, and pentaerythritol triallyl ether; and monomer (c3) is one or two or more monomer selected from among ethylene glycol di(meth)acrylate, triethylene glycol di(meth)acrylate, tetraethylene glycol di(meth)acrylate, trimethylol propane tri(meth)acrylate, and ethoxylated trimethylol propane tri(meth)acrylate.

[22]

The silicone-containing copolymer molded article according to any one of [16] to [21], wherein the content of silicone monomer (a1) and (a2) units is in a range of 20 to 56 mass %, the content of monomer (b) units is in a range of 40 to 60 mass %, and the content of monomer (c1), (c2), and (c3) units is in a range of 0.02 to 4 mass %.

[23]

The silicone-containing copolymer molded article according to any one of [16] to [22], wherein the content of siloxane macromonomer units (e) is 25 mass % or less.

[24]

The silicone-containing copolymer molded article according to any one of [16] to [23], further containing at least one additional monomer unit selected from the group of silicone monomer units not containing hydroxyl groups or polyethylene glycol groups in the molecular structure thereof, and monomer units not containing silicon atoms in the molecular structure thereof.

[25]

The silicone-containing copolymer product of any one of [15] to [24], wherein the hydrophilic surface with a contact angle relative to pure water of 60° or less is obtained without post-processing the lens-forming material after polymerization to enhance the water wettability of the surface, wherein the contact angle is the contact angle of a silicone hydrogel molded article obtained by hydrating the silicone-containing copolymer molded article.

[26]

A precursor for silicone hydrogel soft contact lens in the form of the silicone-containing copolymer molded article according to any one of [14] to [25] and having a contact lens shape.

[27]

A silicone hydrogel soft contact lens obtained by rendering the silicone hydrogel soft contact lens precursor according to [26] a hydrated state with physiological saline or a preservation solution for soft contact lens.

[28]

The soft contact lens according to [27], wherein the hydrated silicone hydrogel soft contact lens exhibits a water content of 35% or greater and less than 60%.

[29]

The soft contact lens according to [27] or [28], wherein the hydrated silicone hydrogel soft contact lens is a soft contact lens with a maximum replacement frequency of up to one month.

[30]

The soft contact lens according to [29], wherein the hydrated silicone hydrogel soft contact lens is of a type with a replacement frequency of one day or two weeks.

[31]

A packaged soft contact lens product wherein the soft contact lens according to any one of [27] to [30] and physiological saline or soft-contact lens-use preservation solution are contained in a sealed container.

[015]

A silicone-containing copolymer molded article containing at least one monomer unit selected from the group consisting of (a1) and (a2) below, the monomer unit of (b) below, and at least one monomer unit selected from the group consisting of (c1) to (c3), and having a hydrophilic surface with a contact angle relative to pure pater of 60° or less (such that the contact angle is the contact angle of a silicone hydrogel molded article obtained by hydrating a silicone-containing copolymer molded article):

(a1) one or two or more units derived from silicone monomers containing at least one hydroxyl group and 1 to 4 silicon atoms per molecule;

(a2) one or two or more silicone monomer units containing at least one polyethylene glycol group and 1 to 4 silicon atoms per molecule;

(b) one or two or more units derived from hydrophilic monomers having a vinyl group;

(c1) one or two or more monomer units containing two or more vinyl groups per molecule;

(c2) one or two or more monomer units containing two or more allyl groups per molecule; and (c3) one or two or more monomers having two or more (meth)acrylate groups per molecule.

[016]

The silicone-containing copolymer molded article according to [015], wherein silicone monomer (a1) is a monomer denoted by general formula (a1-1) or (a1-2) below:

[Chem. 11]

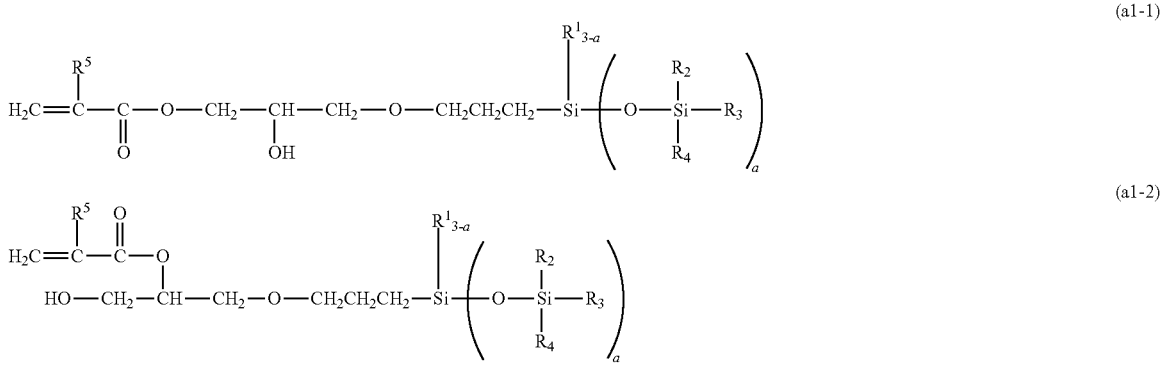

(wherein $R^1$, $R^2$, $R^3$, and $R^4$ denote methyl groups, $R^5$ denotes a hydrogen atom or a methyl group, and a denotes an integer of from 1 to 3) and silicone monomer (a2) is a monomer denoted by general formula (a2-1) below:

[Chem. 12]

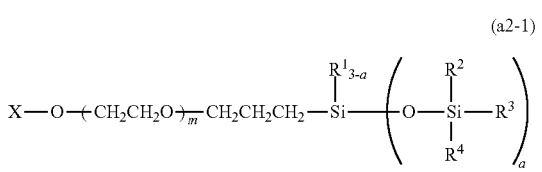

(wherein $R^1$, $R^2$, $R^3$, and $R^4$ denote methyl groups, a denotes an integer of from 1 to 3, m denotes 4 to 8, and X in the formula denotes a substituent selected from the substituents denoted by formulas (Y1) and (Y2) below (wherein $R^5$ denotes a hydrogen atom or a methyl group)):

[Chem. 13]

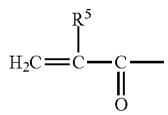

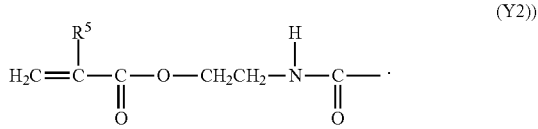

[017]

The silicone-containing copolymer molded article according to [015] or [016], wherein hydrophilic monomer (b) is one or both selected from N-vinyl-2-pyrrolidone and N-vinyl-N-methylacetamide.

[018]

The silicone-containing copolymer molded article according to any one of [015] to [017], wherein monomer (c1) is one or two or more monomer selected from among 1,4-butanediol divinyl ether, diethylene glycol divinyl ether, and triethylene glycol divinyl ether;

monomer (c2) is one or two or more monomer selected from among triallyl isocyanurate, trimethylol propane diallyl ether, and pentaerythritol triallyl ether; and monomer (c3) is one or two or more monomer selected from among ethylene glycol di(meth)acrylate, triethylene glycol (meth)acrylate, tetraethylene glycol di(meth)acrylate, trimethylol propane tri(meth)acrylate, and ethoxylated trimethylol propane tri(meth)acrylate.

[019]

The silicone-containing copolymer molded article according to any one of [015] to [018], wherein the content of silicone monomers (a1) and (a2) units is in a range of 20 to 56 mass %; the content of hydrophilic monomer (b) units is in a range of 40 to 60 mass %; and the content of monomer (c1), (c2), and (c3) units is in a range of 0.02 to 4 mass %.

[020]

The silicone-containing copolymer molded article according to any one of [015] to [019], further containing at least one additional monomer unit selected from the group consisting of siloxane macromonomer units, silicone monomer units not containing hydroxyl groups or polyethylene glycol groups in the molecular structure thereof, and monomer units not containing silicon atoms in the molecular structure thereof.

[021]

The silicone-containing copolymer molded article of any one of [015] to [020], wherein the hydrophilic surface with a contact angle relative to pure water of 60° or less is obtained without post-processing the lens-forming material after polymerization to enhance the water wettability of the surface, wherein the contact angle is the contact angle of a silicone hydrogel molded article obtained by hydrating the silicone-containing copolymer molded article.

[022]

A precursor for silicone hydrogel soft contact lens in the form of the silicone-containing copolymer molded article according to any one of [14] and [015] to [021], and having the shape of a contact lens.

[023]

A silicone hydrogel soft contact lens obtained by rendering the silicone hydrogel soft contact lens precursor according to [022] a hydrated state with physiological saline or a preservation solution for soft contact lens.

[024]

The soft contact lens according to [023] wherein the water content of the silicone hydrogel soft contact lens in a hydrated state is 35% or greater but less than 60%.

[025]

The soft contact lens according to [023] or [024] wherein the silicone hydrogel soft contact lens in a hydrated state is a soft contact lens with a maximum replacement frequency of up to one month.

[026]

The soft contact lens according to [025] wherein the silicone hydrogel soft contact lens in a hydrated state is of a type having a replacement frequency of 1 day or 2 weeks.

[027]

A packaged soft contact lens product wherein the soft contact lens according to any one of [023] to [026] and physiological saline or a preservation solution for soft contact lens are contained in a sealed container.

EFFECT OF THE INVENTION

According to the present invention, the provided is a method for fabricating a silicone-containing copolymer molded article having a hydrophilic surface without post-processing of the lens-forming material after polymerization to enhance the water wettability of the surface and without incorporating a high-molecular-weight hydrophilic polymer to enhance the water wettability of the surface, even using a silicone-containing copolymer obtained by curing using a two-sided casting mold of a hydrophobic material such as polypropylene. According to the present invention, the further provided is a silicone hydrogel contact lens having a hydrophilic surface.

MODES OF CARRYING OUT THE INVENTION

Figure 1:
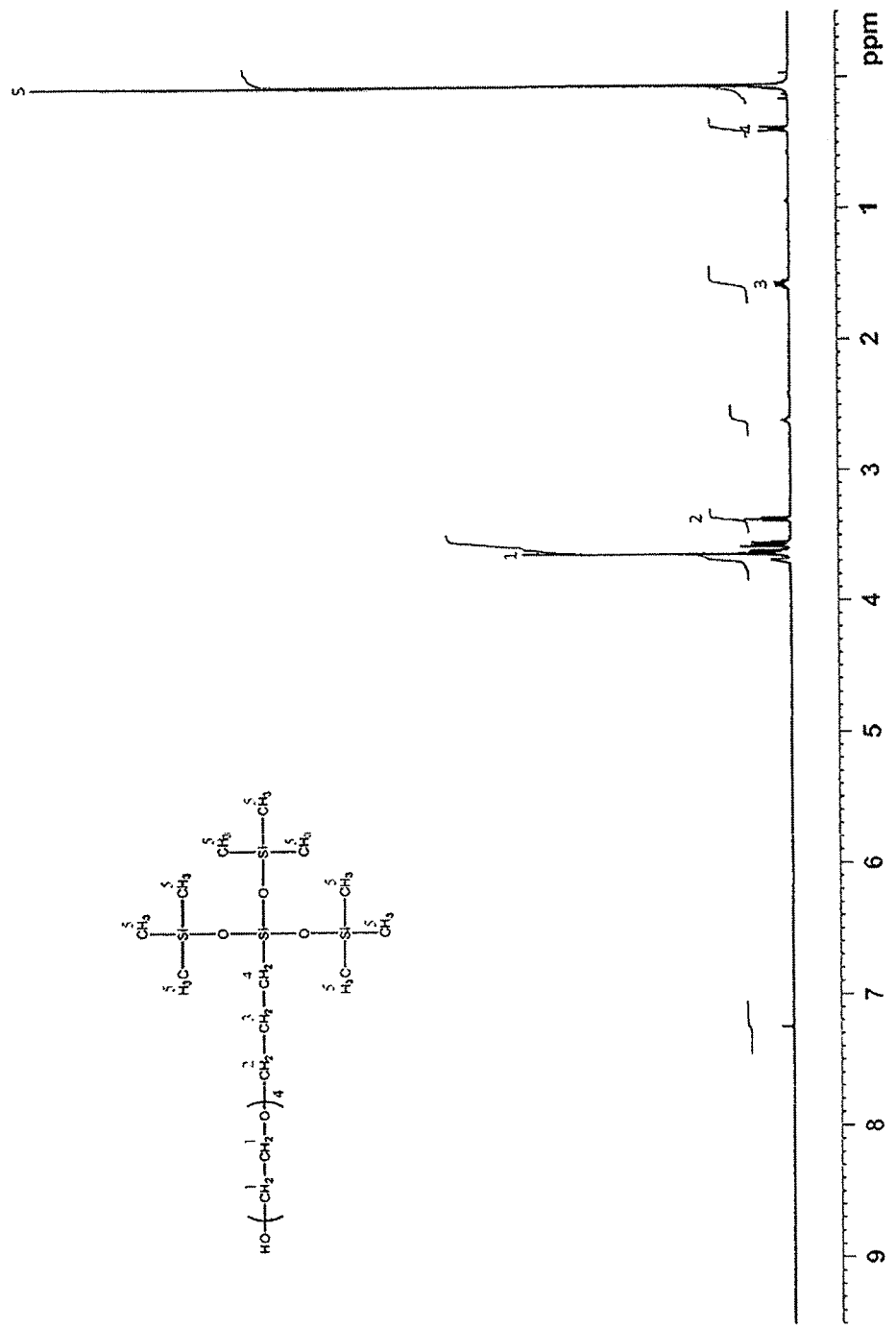
FIG. 1 is a $^1$H-NMR spectrum of a compound obtained in Synthesis Example 1.

[Method for Fabricating a Silicone-Containing Copolymer Molded Article Having a Hydrophilic Surface]

The method for fabricating a silicone-containing copolymer molded article having a hydrophilic surface of the present invention is a method for fabricating a silicone-containing copolymer molded article comprising a silicone monomer unit, hydrophilic monomer unit, and crosslinking monomer unit, and having a hydrophilic surface by polymerizing a monomer solution containing (a) at least one silicone monomer; (b) at least one hydrophilic monomer comprising a vinyl group; (c) at least one crosslinkable monomer; and (d) at least one polymerization initiator in the cavity of a mold having a hydrophobic cavity surface. Here, the polymerization initiator has a 10-hour half-life temperature (T10) of 70° C. or higher and 100° C. or lower. The polymerization is conducted by means of a step P1 of maintaining a temperature within a range of from the T10 of the polymerization initiator contained in the monomer solution to 35° C. below T10 for one hour or longer, and a step P2 of maintaining a temperature higher than T10 of the polymerization initiator contained in the monomer solution for one hour or longer.

<The Mold>

The mold used in the present invention is a mold having a hydrophobic cavity surface. The hydrophobic property of the hydrophobic cavity surface means that the contact angle relative to pure water is 90° or greater. The hydrophobic property of the cavity surface means that a hydrophobic property is produced by the cavity surface or the material of the mold and no special treatment is required to impart a hydrophobic property. However, taking into account the separation property and the like of the lens from the mold after polymerization, there is no intent to exclude molds that have been specifically treated to impart a hydrophobic property to the cavity surface. Further, although the upper limit of the contact angle relative to pure water of the hydrophobic cavity surface is not limited, it is generally 120°. However, there is no intent for there to be a limitation to this angle.

The mold can be one in which the curvatures of the convex surface and concave surface are aligned, and one comprised of materials such as metal and resin. However, a material that affords good separation of the lens from the mold after polymerization, good solvent resistance, and good heat resistance is desirable. The mold having a hydrophobic cavity surface is desirably a resin mold, for example. Resin molds are desirable because they readily permit the manufacturing of molds having the shapes required for desired lens designs. It is desirable to select a resin material that exhibits little molding contraction, delivers good surface transferability from metals, and affords good dimensional precision and resistance to solvents. Polypropylene is desirable because of cost, availability, and the like. However, there is no limitation to polypropylene alone. For example, polyethylene, polyethylene terephthalate, polymethylpentene, polysulfone, polyphenylene sulfide, cyclic olefin copolymers, and ethylene vinyl alcohol copolymers can also be employed.

<The Monomer Solution>

The monomer solution contains: (a) at least one silicone monomer comprising a (meth)acryloyl group; (b) at least one hydrophilic monomer comprising a vinyl group; (c) at least one crosslinkable monomer; and (d) at least one polymerization initiator.

<Silicone Monomer (a)>

Silicone monomer (a) is a silicone monomer with a (meth)acryloyl group. Silicone monomer (a) has one (meth)acryloyl group per molecule. In the present application, the term "(meth)acryloyl group" means either a methacryloyl group or an acryloyl group. In the present application, the silicone monomer suitably has a molecular weight of less than 900. The reason for this is set forth later.

Silicone monomer (a) is desirably a silicone monomer having 1 to 4 silicon atoms per molecule, and at least one hydroxyl group or polyethylene glycol group per molecule. The use of a silicone monomer having at least one hydroxyl group or polyethylene glycol group per molecule yields a silicone-containing copolymer molded article with a good hydrophilic property. Such a silicone monomer can be the silicone monomer of (a1) or (a2) below:

(a1) one or two or more silicone monomers having at least one hydroxyl group and 1 to 4 silicon atoms per molecule; and (a2) one or two or more silicone monomers comprising at least one polyethylene glycol group and 1 to 4 silicon atoms per molecule.

Silicone monomer (a1) can be the monomer denoted by general formula (a1-1) or (a1-2) below, for example.

[Chem. 14]

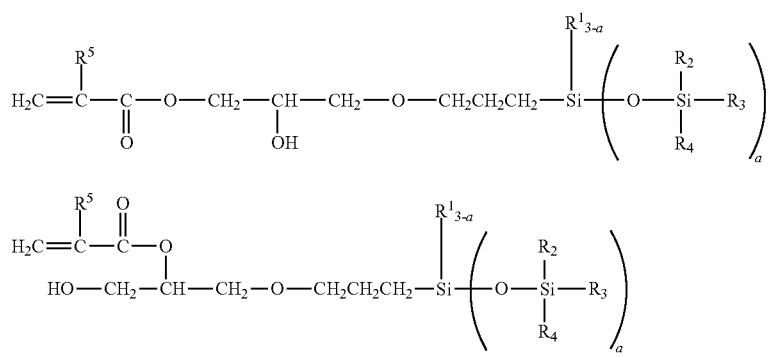

(a1-1)

(a1-2)

In the formulas, $R^1$, $R^2$, $R^3$, and $R^4$ denote methyl groups, $R^5$ denotes a hydrogen atom or a methyl group, and a denotes an integer of from 1 to 3.

Silicone monomer (a2) can be the monomer shown in general formula (a2-1) below, for example.

[Chem. 15]

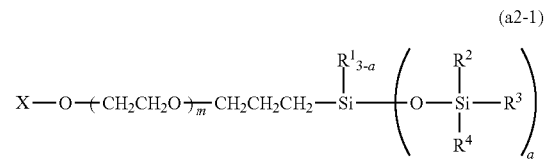

(a2-1)

In the formula, $R^1$, $R^2$, $R^3$, and $R^4$ denote methyl groups, a denotes an integer of from 1 to 3, and m denotes 4 to 8. In the formula, X denotes a substituent selected from among the substituents denoted by formulas (Y1) and (Y2) below. In the formulas, $R^5$ denotes a hydrogen atom or a methyl group.

[Chem. 16]

(Y1)

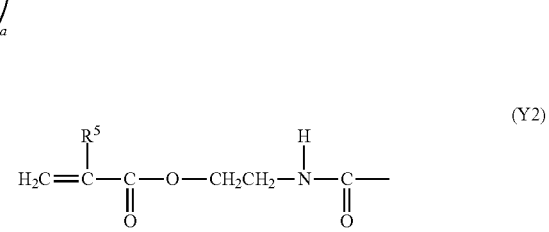

(Y2)

Silicone monomers (a1) and (a2) can also be denoted by general formula (I) below:

[Chem. 17]

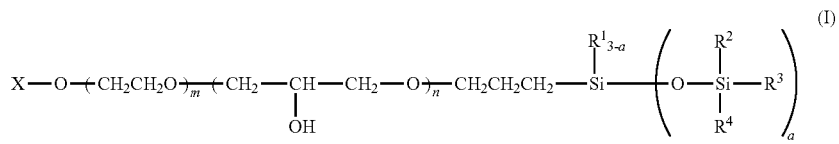

(I)

In the formula, $R^1$, $R^2$, $R^3$, and $R^4$ denote methyl groups, a denotes an integer of from 1 to 3, n denotes 0 or 1, and m denotes 0 or 4 to 8. However, when n is 1, m is 0, and when n is 0, m is 4 to 8 (as an average repeat value). In the formula, X is a substituent selected from among the substituents denoted by formulas (Y1) and (Y2) above.

It is suitable for the silicone monomer to have a molecular weight of less than 900 from the perspectives of preventing diminished strength of the polymer obtained, preventing a decrease in the silicon content per molecule of monomer, and imparting adequate oxygen permeability. When there is a distribution to the repeat number of polyethylene glycol groups, it means that the number average molecular weight is less than 900 based on polystyrene conversion as calculated based on measurement by gel permeation chromatography. The above silicone monomer desirably has a molecular weight in a range of 400 to 850.

The silicone monomer is used to obtain a molded article (such as a lens-shaped product) comprised of a silicone-containing copolymer having a hydrophilic surface. By having at least one hydroxyl group or polyethylene glycol group in the molecule, compatibility with the hydrophilic monomer (such as a hydrophilic monomer having a vinyl group) in the polymerization solution is enhanced and it becomes possible to prepare a homogeneous monomer mixture (polymerization solution) without the use of a solvent.

Silicone monomers with such structures are known compounds. For example, Japanese Unexamined Patent Publication (KOKAI) Showa No. 55-15110 (U.S. Pat. No. 4,139,692), Japanese Unexamined Patent Publication (KOKAI) Showa No. 63-163811, Japanese Unexamined Patent Publication (KOKAI) No. 2001-323024, Japanese Unexamined Patent Publication (KOKAI) No. 2002-113089 (US 2004/014921), Japanese Unexamined Patent Publication (KOKAI) No. 2002-182167, U.S. Pat. No. 4,395,496, and the like disclose contact lens materials in the form of silicone monomer (a1) and Japanese Unexamined Patent Publication (KOKAI) Heisei No. 4-332760 discloses a contact lens material in the form of silicone monomer (a2).

The silicone monomer that is employed in the present invention is preferably a monomer indicated by structural formulas A1 to A7 below:

[Chem. 18]

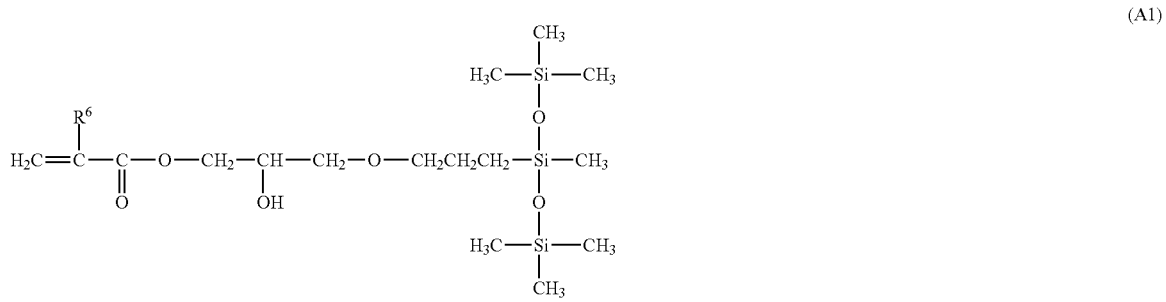

(A1)

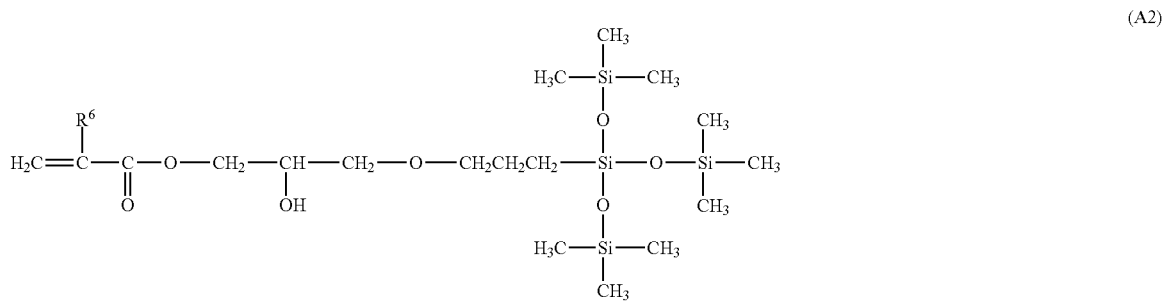

(A2)

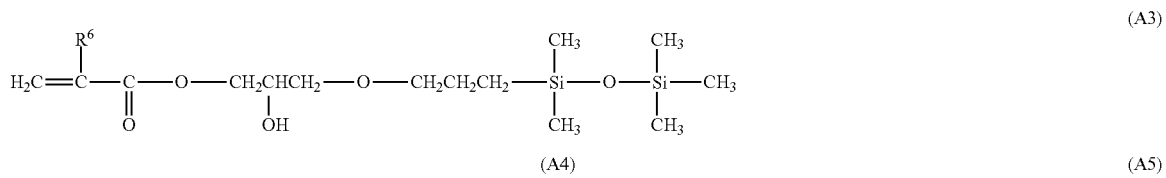

(A3)

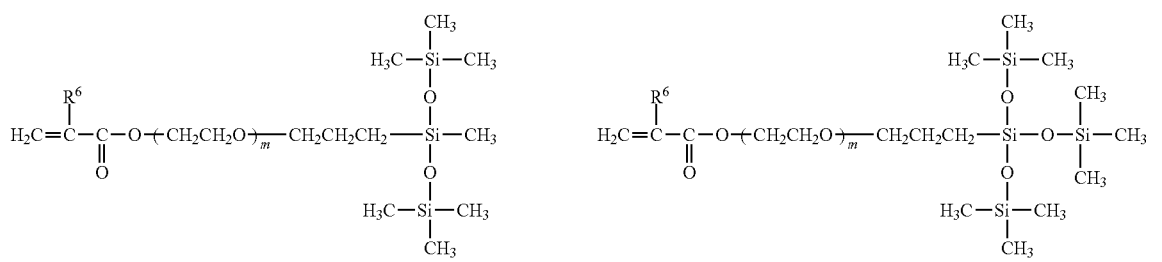

(A4) (A5)

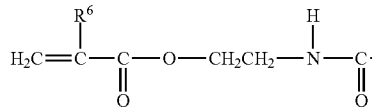
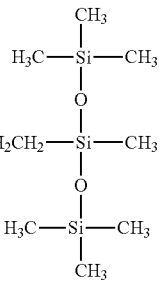
(A6)

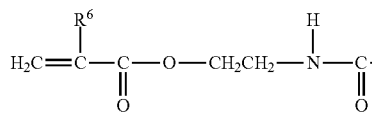
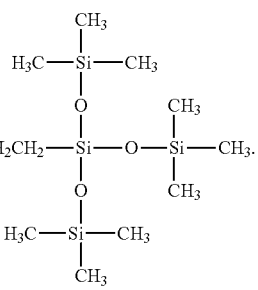
(A7)

In formulas (A1) to (A7), $R^6$ denotes a hydrogen atom or a methyl group. In formulas (A4) to (A7), m denotes 4 to 8. In formulas (A1) and (A2), structural isomers such as formulas (B1) and (B2) below are present in the monomer synthesis process. In the present invention, a mixture of structural isomers can be employed, or silicone monomers comprised of any one structure can be employed. In formula (A3), although not indicated in the structural formula, structural isomers are present in the same manner as in formulas (A1) and (A2).

[Chem. 19]

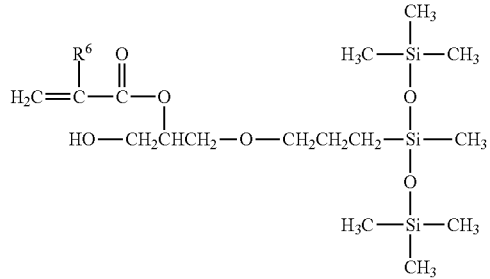

Structural isomer of (A1)

[Chem. 20]

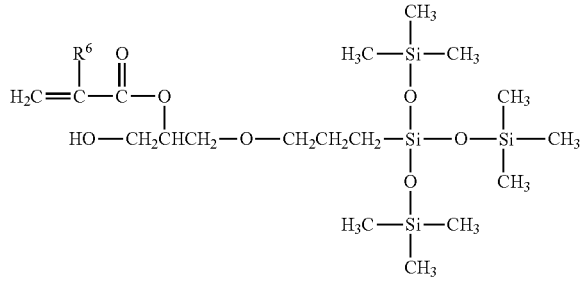

(Structural isomer of A2)

In the formulas, $R^6$ denotes a hydrogen atom or a methyl group.

An example of a method of manufacturing a silicone monomer having a polyethylene glycol group in the molecular structure thereof will be given below. In the present application, the term "polyethylene glycol group" refers to one in which the repeat number of ethylene glycol (average value) is in a range of 4 to 8. That is, it is a method in which one end of an ethylene glycol such as tetraethylene glycol, pentaethylene glycol, hexaethylene glycol, heptaethylene glycol, or octaethylene glycol is allylated, and a hydrosilylation reaction is used to react the product with a tris (trimethylsiloxy)silyl group, methylbis(trimethylsiloxy)silyl group. Next, a compound having a methacryloyl group (such as methacryl chloride or 2-isocyanatoethyl methacrylate) is reacted by means of the hydroxyl group on one end to obtain the targeted silicone monomer. When doing this, it is difficult to obtain a single product in the form of a glycol with a polyethylene glycol repeat number of 4 or greater. Generally, glycols with multiple repeat numbers will be present in mixed form. The monomers of A4 to A7 employed in the present invention can be monomers in which the value of m is distributed and the average value can be 4 to 8. When synthesizing the silicone monomer, the glycols serving as the precursors can be separated into a single repeat number (for example, other numbers (such as 3 or 5) when m is 4) by column fractionation or the like, and then used in synthesis. Monomers in which there is no distribution of the glycol repeat number can also be employed. no distribution in the repeat number of the polyethylene glycol and a single repeat number to be present are desirable in order to reduce the variation in the values of various physical properties, such as the mechanical strength and water wettability of the lenses obtained.

When m is 4 or greater, it is possible to obtain a homogeneous monomer mixture due to good compatibility with the other copolymer components. It is desirable for m to be 8 or less to prevent excessive length of the molecular structure and to prevent the mechanical strength of the lens from decreasing.

In the present Description, the term "average value" applies when there is a distribution to the repeat number of the polyethylene glycol groups in the structure of the silicone monomer; it refers to the repeat number that is calculated using the peak integrated intensity ratio of ethylene oxide units based on $^1$H-NMR analysis of the final structural product or the precursor serving as the starting material.

In the method for manufacturing a silicone-containing copolymer molded article of the present invention and the contact lens that is manufactured from the silicone-containing copolymer molded article, the content of the silicone monomer in the monomer solution is, for example, desirably 20 to 56 mass % relative to the total quantity of all monomers. Keeping the content of the silicone monomer to 20 mass % or more facilitates the preparation of a homogeneous monomer mixture with a hydrophilic monomer (hydrophilic monomer having a vinyl group). Additionally, keeping it to 56 mass % or less prevents the contact lens that is finally obtained from being hard to the touch. The content of the silicone monomer is preferably 20 to 55 mass %, more preferably 25 to 52 mass %.

<Hydrophilic Monomer (b)>

The hydrophilic monomer is a hydrophilic monomer with a vinyl group. The use of a hydrophilic monomer with a vinyl group enhances the water wettability of the lens surface that is finally obtained. Examples of hydrophilic monomers having a vinyl group are either one or both members selected from the group consisting of N-vinyl-2-pyrrolidone and N-vinyl-N-methylacetamide.

In the method for preparing a silicone-containing copolymer molded article of the present invention, a hydrophilic monomer having a vinyl group is used. In the present invention, following polymerization, it is possible to readily obtain a silicone-containing copolymer molded article having a hydrophilic surface without specific post-processing and without using a high-molecular-weight hydrophilic polymer, even when using polypropylene as the mold material.

In the method for manufacturing a silicone-containing copolymer molded article of the present invention and the contact lens that is manufactured from the silicone-containing copolymer molded article, the content of the hydrophilic monomer having a vinyl group in the monomer solution is desirably 40 to 60 mass % of the total quantity of all monomers. By keeping the content of the hydrophilic monomer having a vinyl group to 40 mass % or greater, the hydrophilic property of the lens surface is enhanced. By keeping it to 60 mass % or less, a decrease in the mechanical strength of the lens is prevented. The content of the hydrophilic monomer having a vinyl group is preferably 45 to 60 mass %, and more preferably, 45 to 55 mass %.

<Crosslinkable Monomer (c)>

The crosslinkable monomer crosslinks the hydrophilic monomer having a vinyl group or the monomer having a (meth)acrylate group, imparting heat resistance and solvent resistance to the copolymer. The content of the crosslinkable monomer in the monomer solution suitably is in a range of 0.02 to 4 mass % of the total quantity of all monomers.

By way of example, the crosslinkable monomer can be at least one monomer selected from the group consisting of (c1), (c2), and (c3):

(c1) one or two or more monomers containing two or more vinyl groups per molecule;

(c2) one or two or more monomers containing two or more allyl groups per molecule; and (c3) one or two or more monomers having two or more (meth)acrylate groups per molecule. In the present Description, "(meth)acrylate group" means an acrylate group or methacrylate group.

Crosslinkable monomer (c1) contains two or more vinyl groups per molecule and is thus effective at crosslinking hydrophilic monomer (b). Crosslinkable monomer (c1) can be, by way of example, one or two or more selected from among 1,4-butanediol divinyl ether, diethylene glycol divinyl ether, and triethylene glycol divinyl ether.

Crosslinkable monomer (c2) contains two or more allyl groups per molecule and is thus effective at crosslinking hydrophilic monomer (b). Crosslinkable monomer (c2) can be, by way of example, one or two or more selected from among triallyl isocyanurate, trimethylol propane diallyl ether, and pentaerythritol triallyl ether.

Crosslinkable monomer (c3) has a "(meth)acrylate" group and thus tends to selectively crosslink with the silicone monomer having a "(meth)acrylate" group falling under monomer (a) above. Further, monomer (c3) tends to selectively crosslink with the siloxane macromonomers, silicone monomers not having a hydroxyl group or polyethylene glycol group in the molecular structures thereof, and monomers not having silicon atoms in the molecular structures thereof that are described further below. Monomer (c3) can be, by way of example, one or two or more selected from among ethylene glycol di(meth)acrylate, triethylene glycol di(meth)acrylate, tetraethylene glycol di(meth)acrylate, trimethylol propane tri(meth)acrylate, and ethoxylated trimethylol propane tri(meth)acrylate.

The content of each of crosslinkable monomers (c1) and (c2) desirably is in a range of 0.02 to 1 mass % of the total quantity of all monomers. Keeping the quantity of each of crosslinkable monomers (c1) and (c2) to 0.02 mass % or greater imparts heat resistance and solvent resistance. Keeping this quantity to 1 mass % or less prevents the silicone-containing copolymer obtained from becoming brittle. Crosslinkable monomers (c1) and (c2) are preferably each kept to a mass % of 0.1 to 0.8.

The content of crosslinkable monomer (c3) is desirably 0.1 to 3 mass % of the total quantity of all monomers. Keeping the use quantity of crosslinkable monomer (c3) to 0.1 mass % or greater imparts mechanical strength and durability. Keeping it to 3 mass % or less prevents the soft contact lens that is obtained from becoming brittle. The quantity of crosslinkable monomer (c3) is preferably 0.2 to 2 mass %.

Crosslinkable monomers (c1), (c2), and (c3) can be employed singly or combined for use. The total content when employed in combination is in a range of 0.02 to 4 mass %.

<Polymerization Initiator (d)>

The polymerization initiator has a 10-hour half-life temperature (T10) of 70° C. or higher and 100° C. or lower. By employing a polymerization initiator with a T10 falling within this range, it becomes possible to obtain the silicone-containing copolymer molded article having a hydrophilic surface that is targeted by the present invention from the monomer solution containing monomers (a), (b), and (c) through the two-stage polymerization process of step P1 (maintaining the polymerization temperature for one hour or more within a temperature range of from the T10 of the polymerization initiator to a temperature 35° C. lower than the T10) and step P2 (maintaining a temperature higher than the T10 of the polymerization initiator for one hour or more), which are described in detail further below.

Investigation by the present inventors has revealed that when the above two-stage polymerization process was conducted with a polymerization initiator having a T10 of less than 70° C., only molded articles with deformed lens shapes were obtained that could not be employed as contact lenses. Alternatively, even when a lens-shaped molded article was obtained, the relative composition ratio of the silicon atoms of the lens surface increased, compromising the water wettability of the surface (see the test results of Comparative Examples 1, 2, 4 and 5 of the present application). When the above two-stage polymerization process was conducted with a polymerization initiator having a T10 exceeding 100° C., the molded articles obtained were brittle and could not be removed from the mold (see the test results of Comparative Examples 3 and 6 of the present application).

Examples of the polymerization initiator are azo polymerization initiators and organic peroxide polymerization initiators with a T10 of 70° C. or greater and 100° C. or lower.

The following compounds are specific examples of polymerization initiators with a T10 of 70° C. or greater and 100° C. or lower:

(d1) 1,1'-azobis(cyclohexane-1-carbonitrile (Wako Pure Chemical Industries, Ltd., CAS: 2094-98-6; T10: 88° C. (in toluene));

(d2) t-butylperoxy-2-ethylhexanoate (NOF Corporation, product name: Perbutyl O, CAS: 3006-82-4, T10: 72.1° C. (in benzene));

(d3) 1,1-di(t-hexylperoxy)-3,3,5-trimethylcyclohexane (NOF Corporation, product name: Perhexa TMH, CAS: 104066-39-9, T10: 86.7° C. (in benzene));

(d4) 1,1-di(t-hexylperoxy)cyclohexane (NOF Corporation, product name: Perhexa HC, CAS: 27215-08-3, 22743-71-1, T10: 87.1° C. (in benzene));

(d5) t-hexylperoxyisopropyl carbonate (NOF Corporation, product name: Perhexyl I, CAS: 132929-84-1, T10: 95.0° C. (in benzene));

(d6) t-butylperoxy-3,5,5-trimethylhexanoate (NOF Corporation, product name: Perbutyl 355, CAS: 13122-18-4, T10: 97.1° C. (in benzene)); and (d7) t-butylperoxylaurate (NOF Corporation, product name: Perbutyl L, CAS: 2123-88-8, T10: 98.3° C. (in benzene)).

The T10 of the polymerization initiator can be calculated based on measurement, but it suffices to adopt the values published by the manufacturer. The content of the polymerization initiator can be determined by taking into account the composition of the mixed monomer solution, the conditions of the polymerization process, and the like. For example, it can be in a range of 0.1 to 1 mass %, and desirably is in a range of 0.2 to 0.9 mass %, of the total quantity of the mixed monomer solution.

In the method for preparing a silicone-containing copolymer molded article of the present invention, the above polymerization initiator and polymerization time conditions are combined for use. The reactivity of the monomers differs greatly by functional groups. In particular, reactivity is known to differ greatly for monomers having methacryloyl groups or acryloyl groups, and for monomers having a vinyl group. The half-life of a polymerization initiator is a convenient index for indicating the decomposition rate at a certain temperature. The polymerization reaction is optimized taking into account the T10. However, when a mixture of multiple monomers is used to manufacture a copolymer, it is not easy to optimize based on the T10 alone. The orientation of the optimization also varies based on how the physical properties serving as indicators for optimization are chosen. In the present invention, from the perspective of obtaining a silicone-containing copolymer molded article having a hydrophilic surface, based on the results of various investigation, although the specific mechanism has not necessarily been clarified, it has been determined that a silicone-containing copolymer molded article having a hydrophilic surface can be obtained by using a polymerization initiator with a T10 falling within a range of 70° C. or higher and 100° C. or lower and by means of a polymerization process comprising steps P1 and P2, described further below. Without intending to be bound by theory, it is supposed as follows: In step P1, the decomposition rate of the initiator is slow so that the polymerization reaction proceeds relatively gradually, causing the formation of blocks in which monomers of the same type have preferentially polymerized; subsequently, in step P2, in a state in which these blocks are maintained to some degree, curing proceeds. As a result, portions that have cured in a manner rich in monomers having methacryloyl groups and acryloyl groups and portions that have cured in a manner rich in hydrophilic monomers having vinyl groups are thought to form separately in the copolymer structure. As a result, when the copolymer obtained is hydrated, the portions that have cured in a manner rich in hydrophilic monomers having vinyl groups tend to be exposed on the surface of the copolymer, which is presumed to be why a silicone-containing copolymer molded article having a hydrophilic surface is obtained.

Patent Reference 4 describes (page 14, line 3) 1,1'-azobis (cyanocyclohexane) as a polymerization initiator. The T10 of 1,1'-azobis(cyanocyclohexane) is 88° C. However, it is only described there as an example of an azo-based initiator. The polymerization initiator that is used in the embodiments is only V-64, 2,2'-azobis-2-methylpropanenitrile (CAS: 78-67-1, T10: 65° C.) (the T10 of which is less than 70° C.). In Patent Reference 4, the use of a polymerization initiator having a T10 of 70° C. or greater and 100° or lower in a polymerization process comprising steps P1 and P2, described further below, to obtain a silicone-containing copolymer molded article having a hydrophilic surface is not even suggested.

In Patent Reference 5 in the embodiments, only 2,2'-azobis(2,4-dimethylpentanenitrile) (CAS: 4419-11-8, T10: 51° C.) and azobisisobutyronitrile (CAS: 78-67-1, T10: 65° C.) are employed as polymerization initiators. In Patent Reference 5, the use of a polymerization initiator having a T10 of 70° C. or greater and 100° or lower in a polymerization process comprising steps P1 and P2, described further below, to obtain a silicone-containing copolymer molded article having a hydrophilic surface is not even suggested.

The monomer solution can contain at least one monomer selected from the group consisting of (a1) and (a2) below; at least one monomer selected from the group consisting of (b) below; and at least one monomer selected from the group consisting of (c1), (c2), and (c3) below:

(a1) one or two or more silicone monomers containing at least one hydroxyl group and 1 to 4 silicon atoms per molecule;

(a2) one or two or more silicone monomers containing at least one polyethylene glycol group and 1 to 4 silicon atoms per molecule;

(b) one or two or more hydrophilic monomers a having vinyl group;

(c1) one or two or more monomers containing two or more vinyl groups per molecule;

(c2) one or two or more monomers containing two or more allyl groups per molecule; and (c3) one or two or more monomers having two or more (meth)acrylate groups per molecule.

The content of silicone monomer (a1) and (a2) units of the silicone-containing copolymer molded article is in a range of 20 to 56 mass %, the content of hydrophilic monomer (b) units is in a range of 40 to 60 mass %, and the content of crosslinkable monomer (c1) to (c3) units is in a range of 0.02 to 4 mass %.

The monomer solution may further contain at least one supplemental monomer selected from the group consisting of siloxane macromonomers, silicone monomers that do not contain hydroxyl groups or polyethylene glycol groups in the molecular structure thereof, and monomers that do not contain silicon atoms in the molecular structure thereof. In the present application, a siloxane macromonomer refers to a monomer with a molecular weight of 900 or higher.

In addition to the four components of (a) and (d) set forth above, the silicone-containing copolymer of the present invention may contain components in the form of siloxane macromonomers, silicone monomers that do not contain hydroxyl groups or polyethylene glycol groups in the molecular structure thereof, and monomers that do not contain silicon atoms in the molecular structure thereof to enhance oxygen permeability.

The macromonomers described in Japanese Unexamined Patent Publication (KOKAI) No. 2001-311917, Japanese Unexamined Patent Publication (KOKAI) No. 2001-183502, and Japanese Translated PCT Patent Application Publication (TOKUHYO) Heisei No. 11-502949 are examples of siloxane macromonomers. The entire description given in these publications is hereby incorporated by reference. The macromonomers of general formulas (C1) and (C2) below are particularly desirable. When adopting the method of removal by applying mechanical force to a mold in the course of removing a lens from a mold following the polymerization of a contact lens in a mold, the addition of a component in the form of a siloxane macromonomer having a urethane structure is desirable because it imparts shock resistance to the lens and permits the removal of the lens from the mold without damage.

p preferably denotes 8 to 50, and more preferably, denotes 8 to 40.

[Chem. 22]

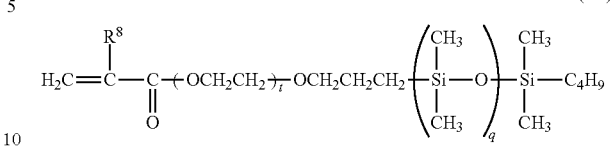

(C2)

In formula (C2), $R^8$ denotes a hydrogen atom or a methyl group, q denotes 9 to 15, and t denotes 0 to 3. q preferably denotes 9 to 13, and more preferably, 9 to 12. t desirably denotes 0 to 2.

Examples of silicone monomers that do not contain hydroxyl groups or polyethylene glycol groups in the molecular structures thereof are one or more monomers such as tris(trimethylsiloxy)-γ-methacryloxypropylsilane, tris(trimethylsiloxy)-γ-acryloxypropylsilane, methacryloyloxyethylsuccinate 3-[tris(trimethylsiloxy)silyl]propyl, methacryloxymethylbis(trimethylsiloxy)methylsilane, 3-methacryloxypropyl-bis(trimethylsiloxy)methylsilane, methacryloxymethyltris(trimethylsiloxy)silane, methacryloxypropylbis(trimethylsiloxy)silanol, and the mono(meth)acryloyl group terminated polydimethylsiloxanes denoted by general formula (C3) below.

[Chem. 23]

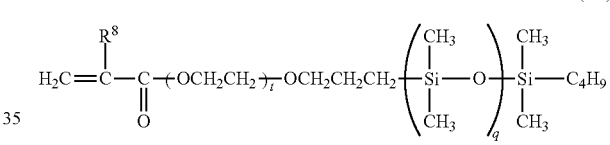

(C3)

In formula (C3), $R^8$ denotes a hydrogen atom or a methyl group, q denotes 4 to 8, and t denotes 0 to 3. q desirably denotes 4 to 6. t desirably denotes 0 to 2.

[Chem. 21]

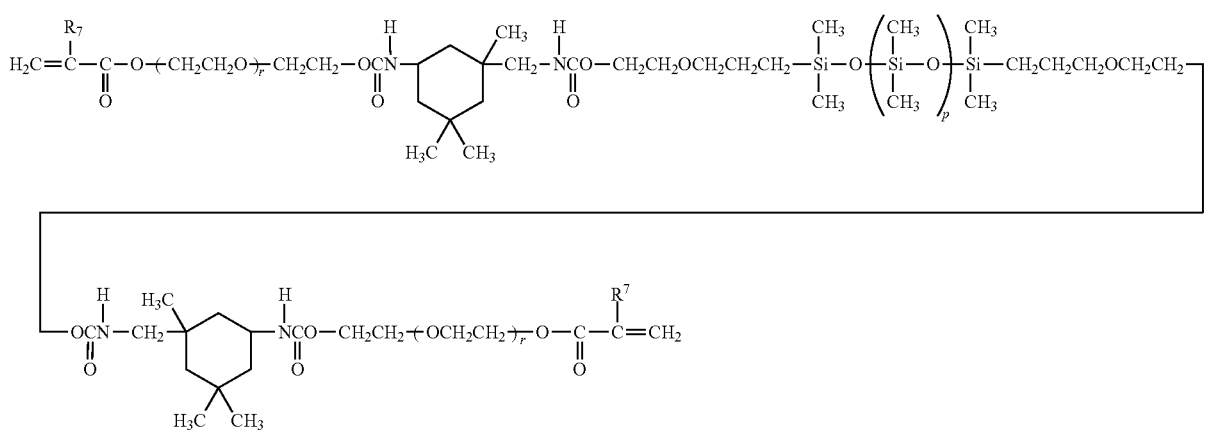

(C1)

In the formula, $R_7$ denotes a hydrogen atom or methyl group, r denotes 0 to 10, and p denotes 8 to 60. r preferably denotes 0 to 8, and more preferably, denotes 0 to 5. Further, These siloxane macromonomers and silicone monomers that do not contain hydroxyl groups or polyethylene glycol groups in the molecular structures thereof may be employed in a range of 0 to 25 mass % of the monomer solution. Keeping the content of these siloxane macromonomers and silicone monomers to 25 mass % or less permits the preparation of a uniform mixed monomer solution without clouding of the mixed monomer solution, as well as preventing deterioration of the water wettability of the lens surface.

Examples of monomers that do not contain silicon atoms in the molecular structure thereof are one or more monomers selected from among 2-hydroxyethyl(meth)acrylate, methacrylic acid, methyl(meth)acrylate, ethyl(meth)acrylate, n-butyl(meth)acrylate, 2-methoxyethyl(meth)acrylate, and 2-methacryloyloxyethylphosphoryl choline. They can be used within a range of 10 mass % or less. In particular, N,N-dimethylacrylamide, which is employed as a structural component of silicone-containing copolymers, is desirably not employed because it causes deterioration of the water wettability of the lens surface following polymerization. Keeping the content of these monomers to less than 10% prevents a decrease in the silicone content in the mixed monomer solution, and as a result, imparts high oxygen permeability. The content of the monomer that does not contain silicon atoms in the molecular structure thereof is preferably 2 to 8 mass %, and more preferably, 3 to 7 mass %. In the present application, "(meth)acrylate" includes meaning of both acrylate and methacrylate.

The silicone-containing copolymer molded article of the present invention may further contain, for example, polymerizable UV absorbing agents and polymerizable dyes as copolymer components to impart UV absorption capability to the soft contact lens obtained and impart coloration to enhance visibility. Specific examples of polymerizable UV absorbing agents are 5-chloro-2-[2-hydroxy-5-(β-methacryloyloxyethylcarbamoyloxyethyl)]phenyl-2H-benzotriazole, 2-[2-hydroxy-5-(β-methacryloyloxyethylcarbamoyloxyethyl)]phenyl-2H-benzotriazole, 5-chloro-2-[2-hydroxy-4-(p-vinylbenzyloxy-2-hydroxypropyloxy)]phenyl-2H-benzotriazole, 4-methacryloxy-2-hydroxybenzophenone, and 2-(2'-hydroxy-5'-methacryloxyethylphenyl)-2H-benzotriazole. Specific examples of polymerizable dyes are: 1,4-bis (4-vinylbenzylamino)anthraquinone, 1-p-hydroxybenzylamino-4-p-vinylbenzylaminoanthraquinone, 1-anilino-4-methacryloylaminoanthraquinone, 1,4-bis[4-(2-methacryloxyethyl)phenylamino]-9,10-anthraquinone, and 4-(5-hydroxy-3-methyl-1-phenyl-4-pyrazolylmethylene)-3-methacrylamino-1-phenyl-2-pyrazoline-5-one.

Other coloring agents in the form of phthalocyanine dyes such as Alcian Blue 8GX and Alcian Green 2GX may be incorporated into the contact lens material of the present invention. Because it is affected by the thickness of the lens that is prepared from this material, the content of the polymerizable UV absorbing agents and polymerizable dyes is suitably 5 mass % or less, preferably 0.02 to 3 mass %, of the total quantity of copolymer components. Keeping the quantity employed to 5 mass % or less is desirable because it prevents a lowering of the mechanical strength of the contact lens obtained and in terms of the safety of the contact lens, which comes in direct contact with the living body.

<The Polymerization Process>

The monomer solution is polymerized in the cavity of a mold having a hydrophobic cavity surface. Polymerization is conducted by means of a step P1 of maintaining for at least one hour a temperature within a range from the T10 of the polymerization initiator contained in the monomer solution to a temperature 35° C. lower than T10, and a step P2 of maintaining for one hour or more a temperature higher than the T10 of the polymerization initiator contained in the monomer solution. In the present Description, the polymerization in step P1 may be referred to as "gelling" and the polymerization in step P2 as "curing."

<Step P1>

A temperature within a range from the T10 of the polymerization initiator contained in the monomer solution to a temperature 35° C. lower than T10 is maintained for at least one hour. The temperature that is maintained in step P1 is desirably one that is in a range from a temperature 10° C. lower than T10 to a temperature 35° C. lower than T10, preferably one that is in a range from a temperature 15° C. lower than T10 to a temperature 35° C. lower than T10, and more preferably, one that is in a range from a temperature 20° C. lower than T10 to a temperature 35° C. lower than T10.

<Step P2>

Step P2 is conducted after step P1. It consists of maintaining for one hour or more a temperature higher than the T10 of the polymerization initiator contained in the monomer solution. The temperature that is maintained in step P2 is desirably one that is in a range of from 5° C. higher than T10 to a temperature that is 50° C. higher than T10, preferably one that is in a range of from 10° C. higher than T10 to a temperature that is 50° C. higher than T10, and more preferably, one that is in a range of from 15° C. higher than T10 to a temperature that is 50° C. higher than T10.

The monomer solution comprised of the components set forth above is, for example, injected into a contact lens-shaped mold for manufacturing contact lenses and then polymerized. In the course of injecting the monomer solution, a mold that has just been molded can be employed, or one that has been stocked for about 10 to 40 hours to stabilize the mold curvature can be employed. Prior to using the mold, it suffices to adequately reduce the pressure to remove substances that affect the reaction of moisture on the mold surface and oxygen or the like, conduct purging with an inert gas such as nitrogen or argon, and then inject the monomer solution into the mold. Further, in the course of injecting the monomer solution, the monomer solution can be used after bubbling with an inert gas such as nitrogen or argon to remove oxygen dissolved in the monomer solution, or used without removing the dissolved oxygen.

The polymerization method desirably includes blending of the above-described polymerization initiator and conducting polymerization by heat. The heating conditions are as set forth above. The atmosphere in the course of polymerization can be air. However, to improve the monomer polymerization rate and reduce the amount of unreacted monomer, polymerization is desirably conducted in an atmosphere of an inert gas such as nitrogen or argon. When conducting polymerization in an atmosphere of an inert gas such as nitrogen or argon, the pressure within the polymerization reactor is desirably 1 kgf/cm$^2$ or less.

The polymerization may be conducted in the presence of a suitable diluting agent. Any suitable diluting agent that uniformly dissolves the monomer components employed will do. Examples are alcohols (such as ethanol, tert-butanol, n-hexanol, and octanol) and esters (such as ethyl acetate, propyl acetate, methyl propionate, ethyl propionate, and butyl propionate). When employing a diluting agent, effects such as the facilitating of injection into the mold because of reduced viscosity of the mixed monomer solution and a reduction in the modulus of elasticity of the mixed monomer solution can be anticipated. The quantity of diluting agent employed is desirably 20 mass % or less of the total quantity of monomer components.

The polymerization schedule in step P1 is maintaining for at least one hour a temperature within a range of from the T10 of the polymerization initiator that is contained in the monomer solution to a temperature 35° C. lower than T10.

The retention period of step P1 is desirably 5 hours or more but not more than 14 hours. Employing a retention period of 5 hours or more facilitates the obtaining of a good hydrophilic surface when subsequently moved to curing. Further, when polymerizing a lens shape, it is easier to obtain a round lens following swelling. However, when 14 hours is exceeded, the total polymerization period (the period combining "gelling" and "curing") becomes excessively long and productivity deteriorates. Thus, it is desirable not to exceed 14 hours. The retention period of "gelling" is preferably from 6 to 12 hours. The retention period (synonymous with "maintenance period") means the period excluding the time required for the temperature to rise to the maintenance (retention) temperature. The period of rising temperature within the scope of the maintenance (retention) temperature is included within the maintenance period (synonymous with "retention period"). Similarly, the period of the rise in temperature from the maintenance (retention) temperature in step P1 to the maintenance (retention) temperature in step P2 refers to time that is not included. The period of rising temperature within the scope of the maintenance (retention) temperature is counted toward the maintenance period (synonymous with "retention period").

In step P2, the maintenance period at the temperature higher than polymerization initiator T10 is one hour or more. For example, it desirably is in a range of from 4 hours to 10 hours from the perspective of completing polymerization.

In both steps P1 and P2, temperature maintenance can be conducted without change during each step. It is also possible to vary the temperature within the prescribed range in each step. For example, in step P1, within the range from the T10 of the polymerization initiator to a temperature 35° C. lower than T10, the temperature can be raised in stepwise fashion. More specifically, for example, (i) the temperature can be maintained for a certain period t1 at 30° C. lower than T10, and then (ii) maintained for a period t2 at a temperature 20° C. lower than T10. In this case, the period of maintenance for one hour or more in step P1 means the period beginning with heating in (i) and running through to the end of heating in (ii), including the period during which the temperature rises to (ii). Similarly, in step P2, the temperature can be raised in stepwise fashion at temperatures higher than the T10 of the polymerization initiator. More specifically, for example, (iii) a temperature 10° C. higher than T10 can be maintained for a certain period t2, and then (iv) a temperature 20° C. higher than T10 can be maintained for a period t2. In this case, the period of maintenance for one or more hours in step P2 means the period from the start of heating in (iii), includes the period of the rise in temperature from (iii) to (iv), and ends with the heating in (iv). In step P2, more specifically, the temperature is raised in stepwise fashion to a maximum temperature of 130° C. or lower and heating is conducted for from 4 to 10 hours, for examples, to conclude polymerization. The polymerization schedule (temperature and time settings) in steps P1 and P2 are not intended to be limited to the above examples, and can be suitably selected.

A solvent (such as methanol, ethanol, isopropyl alcohol, a methanol aqueous solution, an ethanol aqueous solution, or an isopropyl alcohol aqueous solution) can be used to extract and remove unpolymerized monomer and oligomer from a copolymer molded article (lens-shaped, for example) that has been removed from the mold after polymerization. Subsequently, the product can be immersed in physiological saline or a soft contact lens-use preservation solution to obtain a targeted hydrated silicone hydrogel molded article (such as a contact lens).

The water content of the silicone hydrogel molded article of the present invention is desirably 35% or greater and less than 60%. The water content is preferably 35% or greater and 55% or less, and more preferably, 35% or greater and 50% or less.

The hydrophilic surface of the hydrated silicone hydrogel molded article obtained by the manufacturing method of the present invention has a contact angle relative to pure water of 60° or less when the surface of the molded article following polymerization has not been post-processed to enhance the water wettability of the surface. It desirably has a contact angle relative to pure water of 55° or less, preferably a contact angle relative to pure water of 50° or less, and more preferably, a contact angle relative to pure water of 45° or less. The lower limit of the contact angle relative to pure water is not specifically restricted. However, in practical terms, it is 10° or more, or 15° or more.

In the present invention, "special post-processing" refers to a method to enhance the water wettability of the surface of the contact lens such as a plasma treatment, graft treatment, alkaline treatment, acid treatment, or the biocompatible LbL coating disclosed in Japanese Translated PCT Patent Application Publication (TOKUHYO) No. 2005-538767. The "hydrophilic surface" refers to a contact angle of 60° or less as measured by the liquid-drop method using pure water.

In the case where the mold having a hydrophilic cavity surface is a two-sided polyalkylene casting mold for molding contact lenses, the silicone hydrogel molded article will be a silicone hydrogel soft contact lens.

<The Silicone-Containing Copolymer Molded Article and Silicone Hydrogel Molded Article>

The present invention covers a silicone hydrogel molded article and a silicone-containing copolymer molded article prepared by the method of the present invention set forth above. Silicone hydrogel molded articles include silicone hydrogel soft contact lenses.

The present invention is a silicone-containing copolymer molded article comprising at least one monomer unit selected from the group consisting of (a1) and (a2) below, a monomer unit (b), and at least one monomer unit selected from the group consisting of (c1) to (c3) below, having a contact angle relative to pure water of 60° or less, wherein the contact angle is the contact angle of a silicone hydrogel molded article obtained by hydrating the silicone-containing copolymer molded article:

(a1) one or two or more units derived from silicone monomers containing at least one hydroxyl group and 1 to 4 silicon atoms per molecule;

(a2) one or two or more silicone monomer units containing at least one polyethylene glycol group and 1 to 4 silicon atoms per molecule;

(b) one or two or more units derived from hydrophilic monomers having vinyl groups;

(c1) one or two or more monomer units containing two or more a vinyl group per molecule;

(c2) one or two or more monomer units containing two or more allyl groups per molecule; and (c3) one or two or more monomers having two or more (meth)acrylate groups per molecule.

Silicone monomer (a1) is, for example, a monomer denoted by general formula (a1-1) or (a1-2) below:

[Chem. 24]

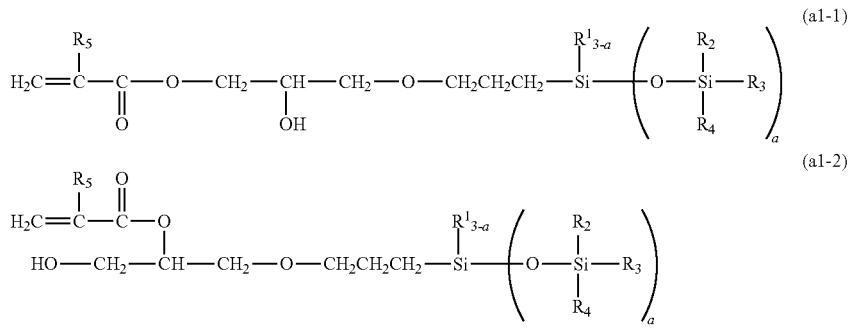

In the formula, $R^1$, $R^2$, $R^3$, and $R^4$ denote methyl groups, $R^5$ denotes a hydrogen atom or a methyl group, and a denotes an integer of from 1 to 3.

Silicone monomer (a2) is, for example, a monomer denoted by general formula (a2-1) below:

[Chem. 25]

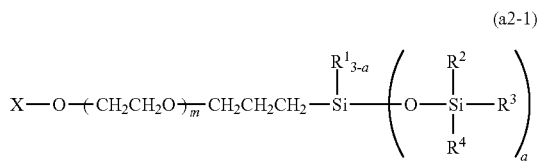

In the formula, $R^1$, $R^2$, $R^3$, and $R^4$ denote methyl groups, a denotes an integer of from 1 to 3, and m denotes 4 to 8. In the formula, X denotes a substituent selected from the substituents denoted by formulas (Y1) or (Y2) below (wherein $R^5$ denotes a hydrogen atom or a methyl group):

[Chem. 26]

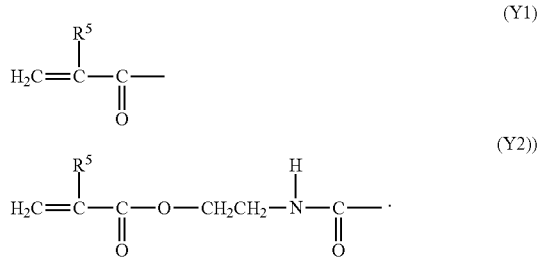

Hydrophilic monomer (b) can be N-vinyl-2-pyrolidone or N-vinyl-N-methylacetamide, or both.

By way of example, crosslinkable monomer (c1) is one or two or more selected from among 1,4-butanediol divinyl ether, diethylene glycol divinyl ether, and triethylene glycol divinyl ether. By way of example, crosslinkable monomer (c2) is one or two or more selected from among triallyl isocyanurate, trimethylol propane allyl ether, and pentaerythritol triallyl ether. By way of example, crosslinkable monomer (c3) is one or two or more selected from among ethylene glycol di(meth)acrylate, triethylene glycol di(meth)acrylate, tetraethylene glycol di(meth)acrylate, trimethylol propane tri(meth)acrylate, and ethoxylated trimethylol propane tri(meth)acrylate.

The content of silicone monomer (a1) and (a2) units is in a range of 20 to 56 mass %. The content of hydrophilic monomer (b) units is in a range of 60 to 60 mass %. And the content of monomer (c1), (c2), and (c3) units is in a range of 0.02 to 4 mass %.

The above mentioned silicone-containing copolymer molded article further contains at least one additional monomer unit selected from the group consisting of siloxane macromonomer units, silicone monomer units that do not have hydroxyl groups or polyethylene glycol groups in the molecular structure thereof, and monomer units that do not have silicon atoms in the molecular structure thereof. The content of the additional monomer unit can be suitably determined based on the type of monomer.

The various components of the silicone-containing copolymer molded article are identical to those described for the method for manufacturing a silicone-containing copolymer molded article of the present invention.

The hydrophilic surface of the hydrated silicone hydrogel molded article is a hydrophilic surface with a contact angle relative to pure water of 60° or less that can be obtained without subjecting the lens-shaped material after polymerization to post-processing to enhance the water wettability of the surface. The contact angle relative to pure water is the contact angle obtained by measuring the contact angle by the drop method using pure water.

<The Precursor for Silicone Hydrogel Soft Contact Lens>

The present invention covers a precursor for a silicone hydrogel soft contact lens which is the silicone-containing copolymer molded article of the present invention in the shape of a contact lens.

<The Soft Contact Lens>

The present invention covers a soft contact lens obtained by immersing the above precursor for a silicone hydrogel soft contact lens of the present invention in physiological saline or a soft contact lens preservation solution to render the precursor in a hydrating state.

The hydrated soft contact lens can have a water content of, for example, 35% or more, but less than 60%. The water content is desirably 38% or more and 55% or less, and preferably, 40% or more and 50% or less.

The hydrated soft contact lens of the present invention can be a soft contact lens with a maximum replacement frequency of one month. When the replacement frequency is one month or less, any number of days will do. For example, the hydrated soft contact lens of the present invention can be a type having a replacement frequency of a single day (the so-called "one day type") or of two-week (the two-week type). However, no limitation to these values is intended.

<The Packaged Soft Contact Lens Product>

The present invention covers a packaged soft contact lens product including the soft contact lens of the present invention and physiological saline or a soft contact lens-use storage solution sealed in a container. Existing items can be used as is for the soft contact lens-use preservation solution and sealed container.

EMBODIMENTS

The present invention will be described in detail based on embodiments below. However, the present invention is not limited to the embodiments.
[Components Employed]
The names and abbreviations of the chemical substances employed in the embodiments and comparative examples are indicated below.
(a) the Silicone Monomer Having at Least One Hydroxyl Group or Polyethylene Glycol Group in the Molecular Structure Thereof 3Si-GMA: (3-methacryloxy-2-hydroxypropoxy)-propylbis(trimethylsiloxy)methylsilane [CAS: 69861-02-5]

The relative content ratio in 3Si-GMA of the (D1) structure below was 75 mass % and of the (D2) structure was 25 mass %.

[Chem. 27]

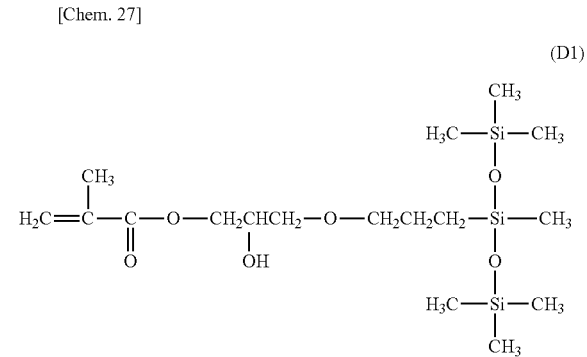

4Si-GMA: (3-methacryloxy-2-hydroxypropoxy) propyltris(trimethylsiloxy)silane [CAS: 71223-14-8]

The relative content ratio in 4Si-GMA of structure (D3) below was 82 mass % and of structure (D4) was 18 mass %.

[Chem. 28]

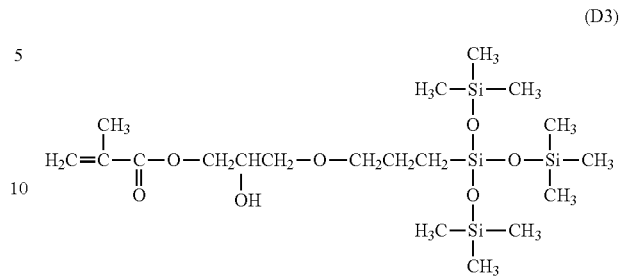

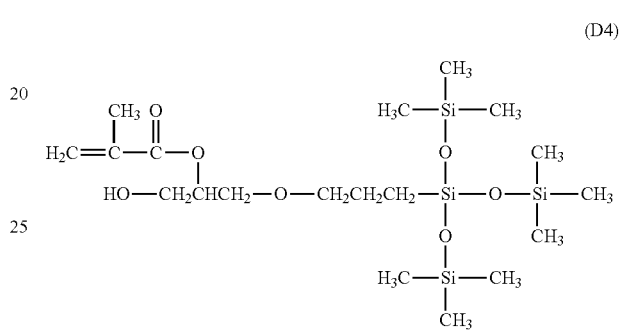

4Si-4PEG: The silicone monomer obtained in Synthesis Example 1
4Si-6PEG: The silicone monomer obtained in Synthesis Example 2
(b) Hydrophilic Monomer Having a Vinyl Group
NVP: N-vinyl-2-pyrrolidone [CAS: 88-12-0]
VMA: N-vinyl-N-methyl acetamide [CAS: 3195-78-6]
(c) Crosslinkable Monomer Having Two or More Allyl Groups or Vinyl Groups Per Molecule
TAIC: Triallyl isocyanurate [CAS: 1025-15-6]
BDVE: 1,4-butanediol divinyl ether [CAS: 3891-33-6]
TEGDVE: triethylene glycol divinyl ether [CAS: 765-12-8]
(c) Crosslinkable Monomer Having Two or More (Meth) Acrylate Groups
EDMA: ethylene glycol dimethacrylate [CAS: 97-90-5]
4G: tetraethylene glycol dimethacrylate [CAS: 109-17-1]
(d) Polymerization Initiator Having a 10-Hour Half-Life Temperature of 70° C. or Greater and 100° C. or Less
V-40: 1,1'-azobis(cyclohexane-1-carbonitrile (Wako Pure Chemical Industries, Ltd., CAS: 2094-98-6; 10-hour half-life temperature: 88° C.
Perbutyl O: t-butylperoxy-2-ethyl hexanoate (NOF Corporation, CAS: 3006-82-4, 10-hour half-life temperature: 72.1° C.);
Perhexa HC: 1,1-di(t-hexylperoxy)cyclohexane (NOF Corporation, CAS: 27215-08-3, 22743-71-1, 10-hour half-life temperature: 87.1° C.);
Perhexyl I: t-hexylperoxyisopropyl carbonate (NOF Corporation, CAS: 132929-84-1, 10-hour half-life temperature: 95.0° C.);
(e) Siloxane Macromonomer
Macromer A: Siloxane macromonomer obtained in Synthesis Example 3
Macromer B: Siloxane macromonomer obtained in Synthesis Example 4
FM-0711: Monomethacryloyl terminated polydimethylsiloxane [JNC Corp., product name: Silaplane FM-0711]

[Chem. 29]

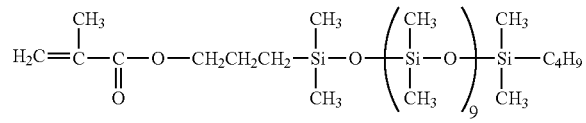

(D5)

(f) Silicone Monomers that do not Contain Hydroxyl Groups or Polyethylene Glycol Groups in the Molecular Structure Thereof
TRIS: Tris(trimethylsiloxy)-γ-methacryloxypropylsilane [CAS: 17096-07-0]

[Chem. 30]

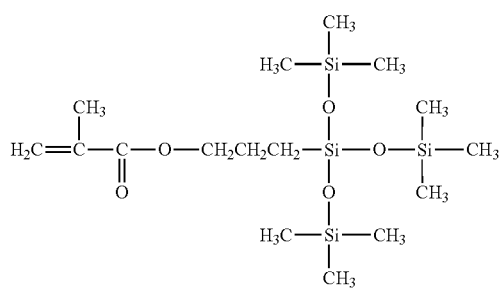

(D6)

MCR-M07: Monomethacroyloxypropyl-terminated polydimethylsiloxane [Gelest Corp., product code: MCR-M07, CAS: 146632-07-7]

[Chem. 31]

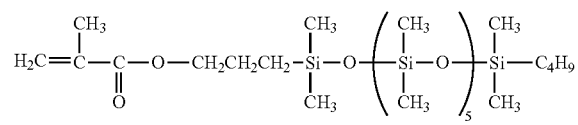

(D7)

(g) Monomer that does not Contain Silicon Atoms in the Molecular Structure Thereof
HEMA: 2-hydroxyethyl methacrylate [CAS: 868-77-9]
DMAA: N,N-dimethylacrylamide [CAS: 2680-03-7]
2-MEA: 2-methoxyethylacrylate [CAS: 3121-61-7]
(h) Polymerization Initiators Having a T10 of Less than 70° C. or Exceeding 100° C. Photo-Polymerization Initiators
V-65: 2,2'-azobis(2,4-dimethylvaleronitrile) [Wako Pure Chemical Industries, Ltd., CAS: 4419-11-8, 10-hour half-life temperature: 51° C.]
V-60: 2,2'-azobisisobutyronitrile [Wako Pure Chemical Industries, Ltd., CAS: 78-67-1, 10-hour half-life temperature: 65° C.]
V-30: 1-[(1-cyano-1-methylethyl)azo]formamide [Wako Pure Chemical Industries, Ltd., CAS: 10288-28-5, 10-hour half-life temperature: 104° C.]
Darocur 1173: 2-hydroxy-2-methyl-1-phenylpropane-1-one [Sigma-Aldrich, CAS: 7473-98-5]

Synthesis Example 1

Synthesis of Silicone Monomer Having PEG Moiety Repeat Number of Just 4

Commercial tetraethylene glycol was purchased and column purification was used to reduce the repeat number of the PEG moiety to just 4 (Compound 1). Next, just one end of the tetraethylene glycol was protected with trityl chloride (Compound 2). The remaining end was allylated with allyl chloride (Compound 3). To Compound 3 (15.0 g: 31.47 mmol) were added tris(trimethylsiloxy)silane (9.34 g: 31.47 mmol) and platinum divinyltetramethyldisiloxane complex in xylene (300 μL). The mixture was heated for 3 days at 35° C. without solvent. Disappearance of the starting material was confirmed by TLC, after which column purification was conducted to obtain Compound 4 (15.8 g).

Next, to compound 4 (5.0 g: 6.47 mmol) were added 25 mL of chloroform and triethylsilane (827 mg: 7.11 mmol). Boron trifluoride diethyl ether complex (917.7 mg: 6.47 mmol) was then added dropwise with water cooling and the mixture was stirred for 30 minutes. The target compound was confirmed by TLC and LC-MS, after which the reaction solution was diluted with chloroform, washed with saturated saline, dried with anhydrous sodium sulfate, and concentrated to obtain the target compound in unpurified form. Column purification and overnight drying with a vacuum pump were conducted, yielding the targeted Compound 5 (2.27 g).

Reaction formula

[Chem. 32]

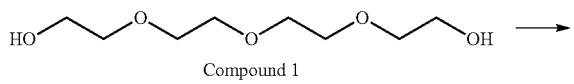

Compound 1

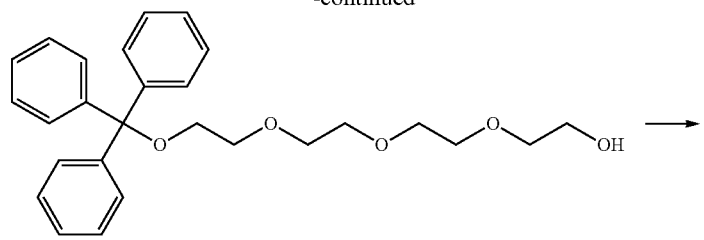

Compound 2

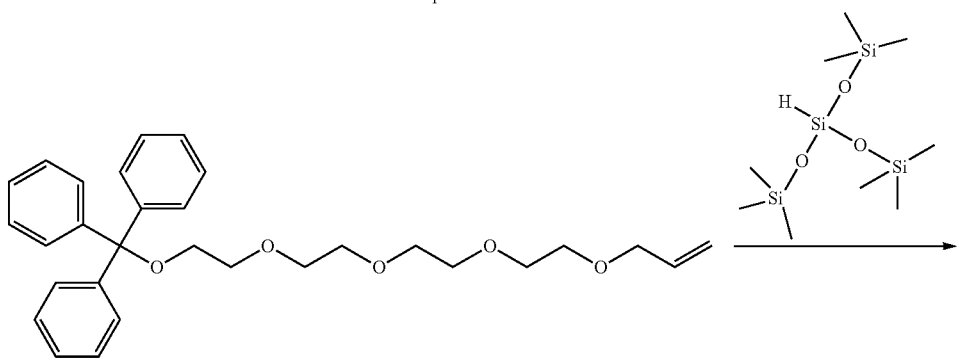

Compound 3

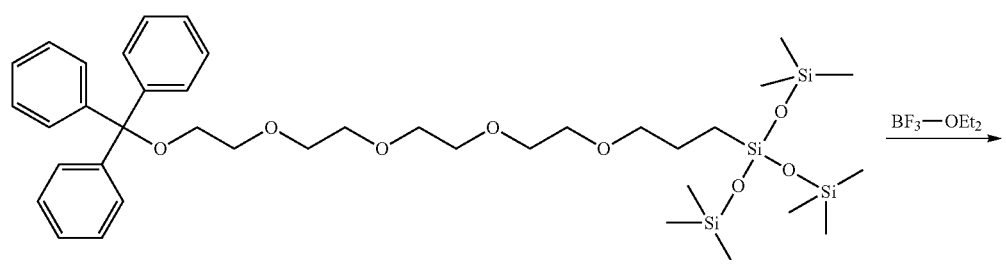

Compound 4

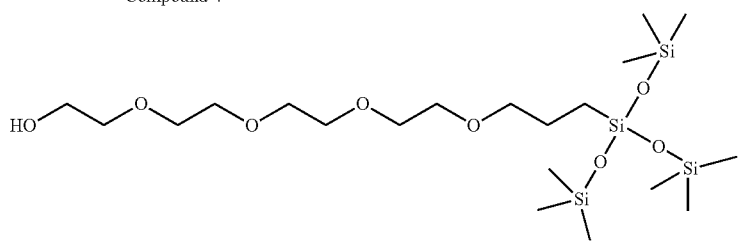

Compound 5

Figure 2:
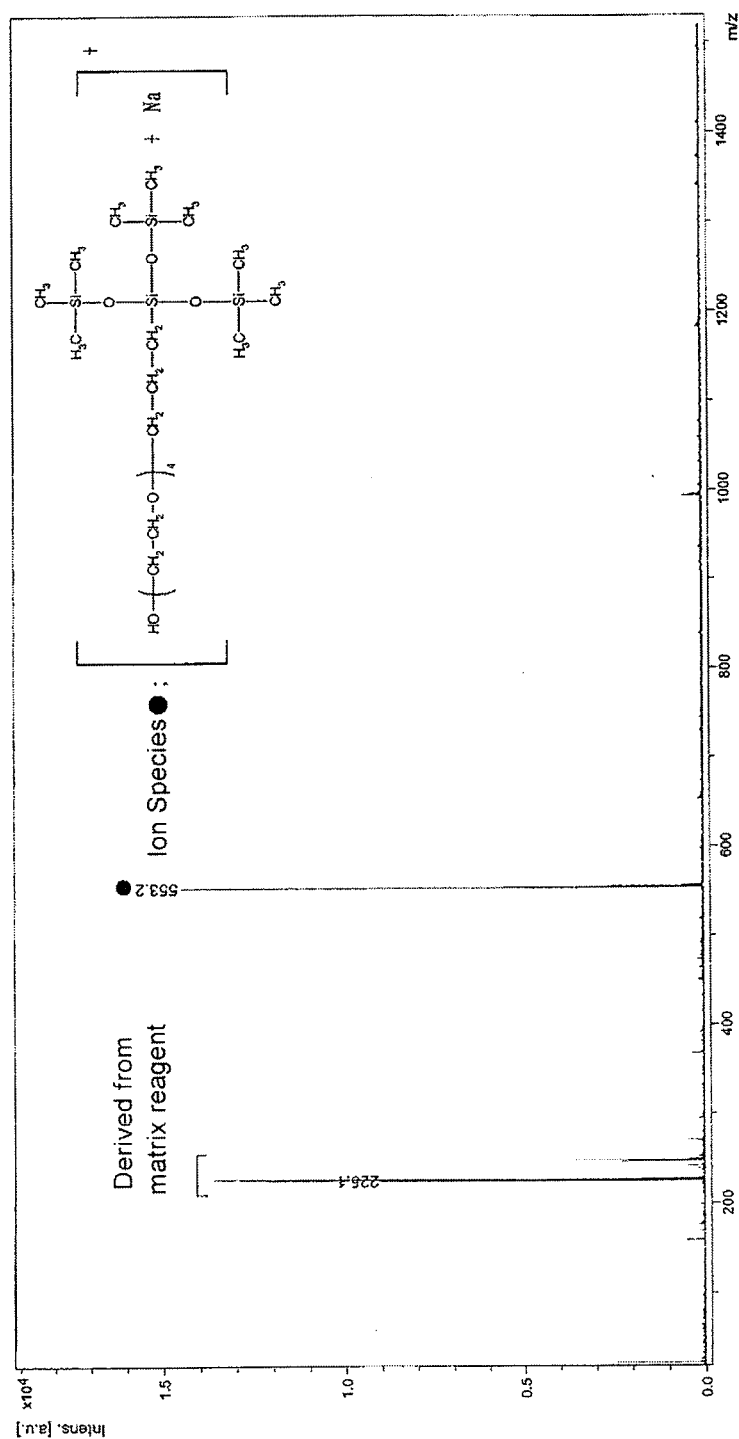
FIG. 2 is a MALDI-TOF MS spectrum of a compound obtained in Synthesis Example 1.

FIG. 1 shows a $^1$H-NMR spectrum and FIG. 2 shows an MALDI-TOF MS spectrum of Compound 5. The $^1$H-NMR spectrum reveals peaks derived from an ethylene oxide structural unit (3.6 ppm) and tris(trimethylsiloxy)propylsilane structures (3.4 ppm, 1.6 ppm, 0.4 ppm, and 0.1 ppm). The MALDI-TOF MS spectrum indicates that m/z=553, corresponding to the sodium adduct ion of the target compound, was detected. Ions of other unit numbers (such as 3 and 5) were not detected. The compound obtained was thus confirmed to have a repeat number of just 4 for ethylene oxide.

[Chem. 33]

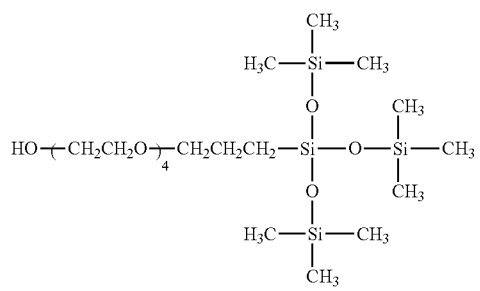

(E1)

The $^1$H-NMR measurement conditions were as follows:
Observation frequency: 600 MHz
Measurement solvent: CDCl$_3$
Measurement temperature: 300 K
Chemical shift standard: Measurement solvent [7.25 ppm]
The MALDI-TOF MS measurement standards were as follows:
Laser beam source: N$_2$ laser (wavelength: 337 nm)
Measurement mode: Reflector mode, positive ion mode
Measurement mass range (m/z): 20 to 1,500
Cumulative number: 1,0000
Ionization reagent: Sodium trifluoroacetate (THF solution)

This siloxane compound, denoted as E1, was then reacted with methacryloyl chloride using 1,8-diazabicyclo[5.4.0]-7-undecene as a catalyst in n-hexane solvent. After the reaction, the solution was filtered through glass fiber filter paper, washed with methanol followed by a saturated saline solution, dried with anhydrous sodium sulfate, and column purified. The solvent was then distilled off, yielding a monomer of formula E2 below (referred to as 4Si-4PEG hereinafter).

[Chem. 34]

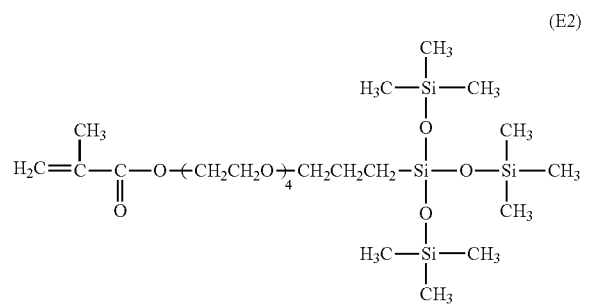

(E2)

Synthesis Example 2

Synthesis of Silicone Monomer Having PEG Moiety Repeat Number of Just 6

Commercial hexaethylene glycol was purchased and column purification was used to reduce the repeat number of the PEG moiety to just 6 (Compound 6). Next, just one end of the hexaethylene glycol was protected with trityl chloride (Compound 7). The remaining end was allylated with allyl chloride (Compound 8). To Compound 8 (17.8 g: 31.47 mmol) were added tris(trimethylsiloxy)silane (9.34 g: 31.47 mmol) and platinum divinyltetramethyldisiloxane complex in xylene (300 μL). The mixture was heated for 3 days at 35° C. without solvent. Disappearance of the starting material was confirmed by TLC, after which column purification was conducted to obtain Compound 9 (17.6 g). Next, to Compound 9 (5.56 g: 6.47 mmol) were added 25 mL of chloroform and triethylsilane (827 mg: 7.11 mmol). Boron trifluoride diethyl ether complex (917.7 mg: 6.47 mmol) was then added dropwise with water cooling and the mixture was stirred for 30 minutes. The target compound was confirmed by TLC and LC-MS, after which the reaction solution was diluted with chloroform, washed with saturated saline, dried with anhydrous sodium sulfate, and concentrated to obtain the target compound in unpurified form. Column purification and overnight drying with a vacuum pump were conducted, yielding the targeted Compound 10 (2.40 g).

Reaction formula

[Chem. 35]

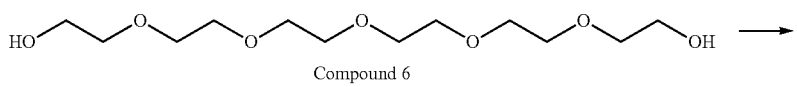

Compound 6 →

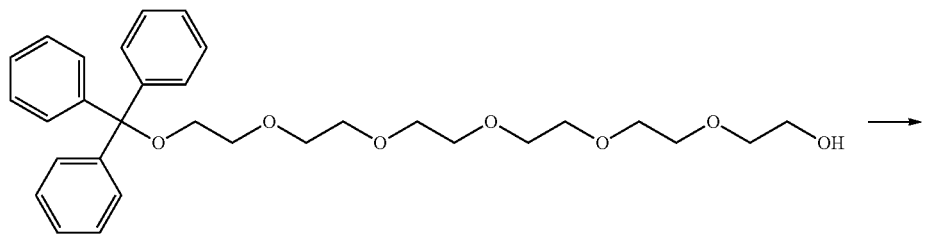

Compound 7 →

-continued

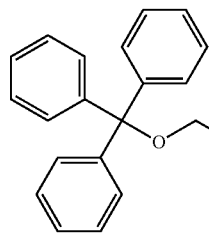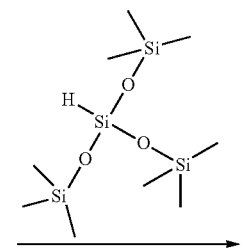

Compound 8

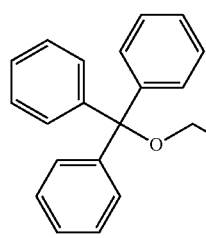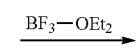

Compound 9

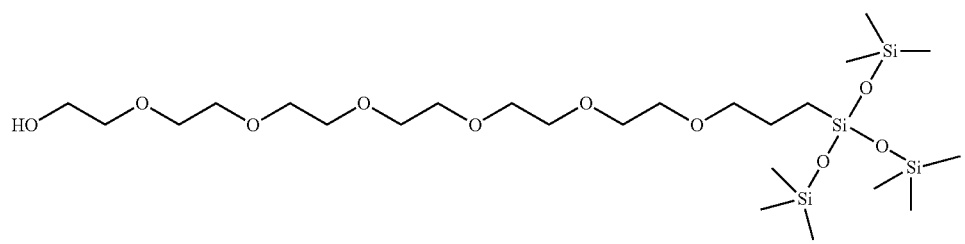

Compound 10

Figure 3:
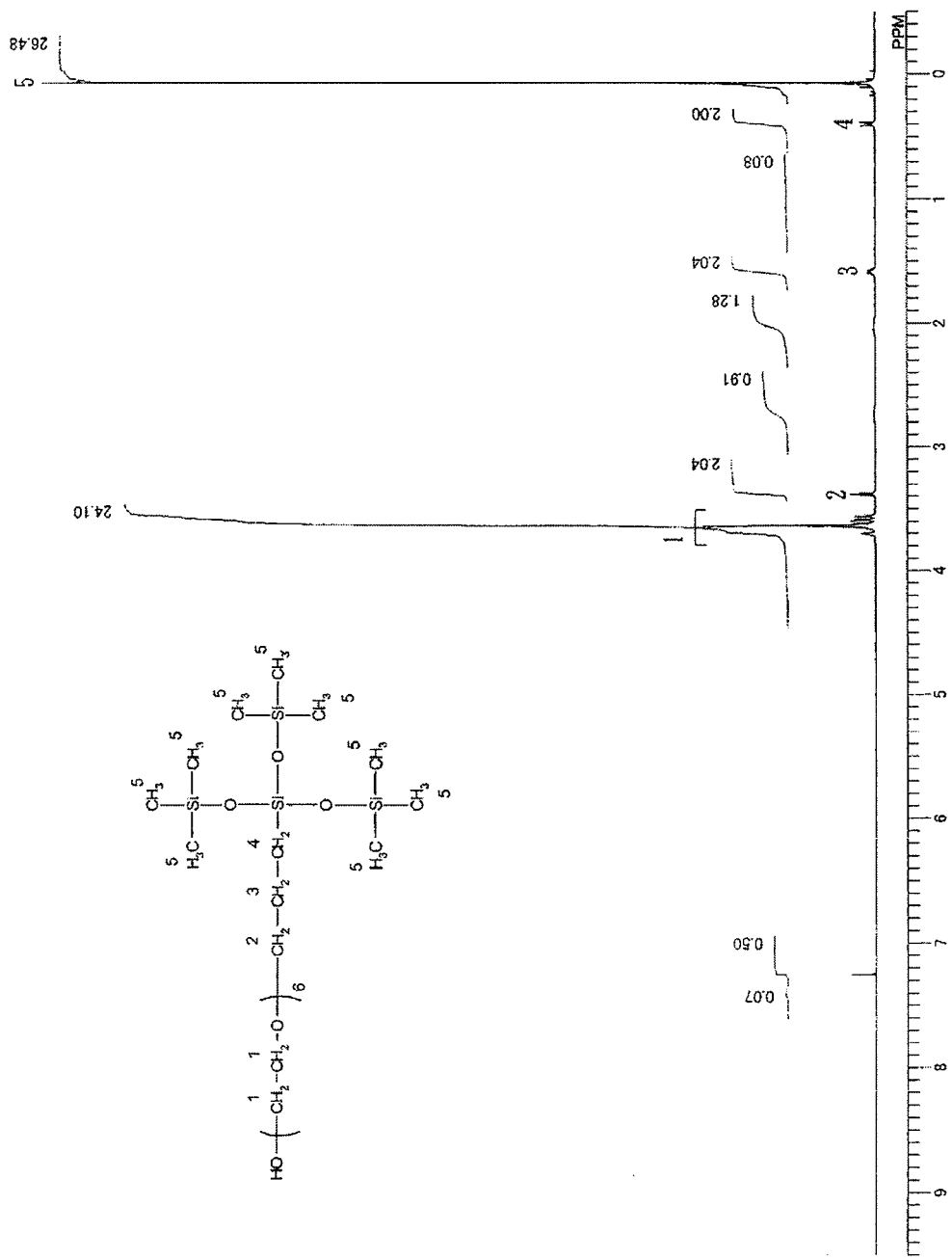
FIG. 3 is a $^1$H-NMR spectrum of a compound obtained in Synthesis Example 2.
Figure 4:
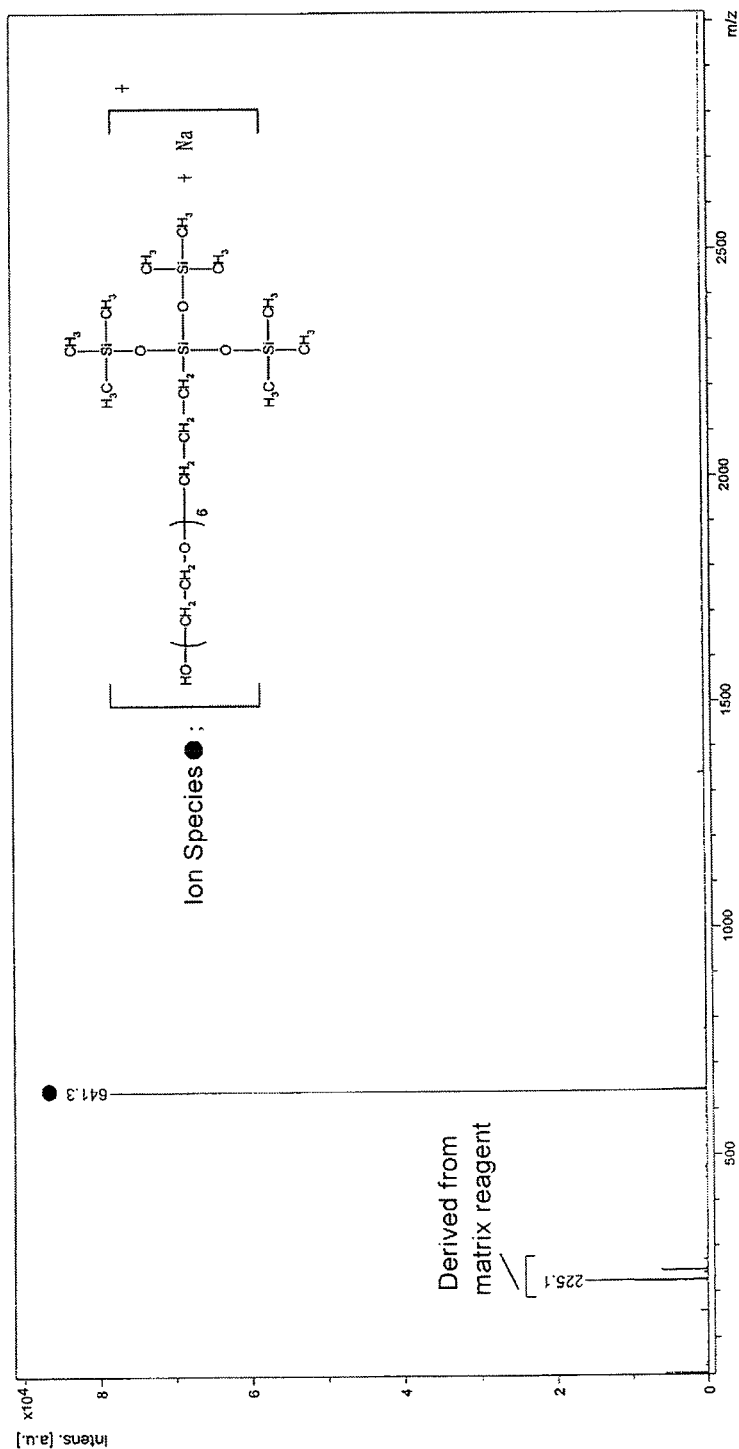
FIG. 4 is a MALDI-TOF MS spectrum of a compound obtained in Synthesis Example 2.
Figure 5:
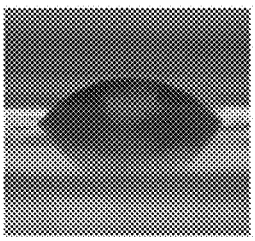
FIG. 5 gives the measurement results (images) of the contact angles relative to pure water of the silicone-containing copolymer molded articles obtained in Embodiments 1 to 4 and Comparative Examples 1 and 2.

FIG. 3 shows a $^1$H-NMR spectrum and FIG. 4 shows an MALDI-TOF MS spectrum of Compound 10. The $^1$H-NMR spectrum reveals peaks derived from an ethylene oxide unit (3.6 ppm) and tris(trimethylsiloxy)propylsilane structures (3.4 ppm, 1.6 ppm, 0.4 ppm, and 0.1 ppm). The MALDI-TOF MS spectrum indicates that m/z=641, corresponding to the sodium adduct ion of the target compound, was detected. Ions of other unit numbers (such as 5 and 7) were not detected. The compound obtained was thus confirmed to have a repeat number of just 6 for ethylene oxide.

[Chem. 36]

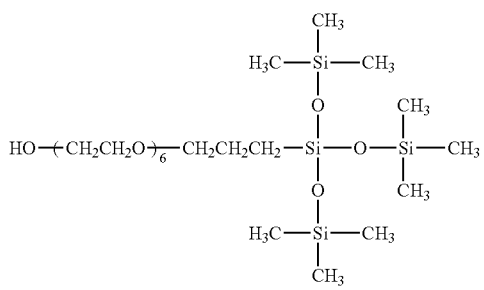

(E3)

This siloxane compound, denoted as E3, was then reacted in methylene chloride solvent using dibutyltin laurate as a catalyst with 2-isocyanatoethyl methacrylate. After the reaction, the solution was column purified. The solvent was then distilled off, yielding a monomer of formula E4 below (referred to as 4Si-6PEG hereinafter).

[Chem. 37]

(E4)

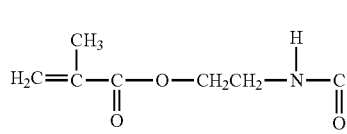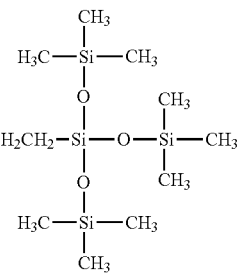

Synthesis Example 3

Synthesis of Macromer A

To a three-necked 100 mL capacity flask were charged 35 g of two-terminal carbinol-modified polydimethyl siloxane (Shin-Etsu Chemical Co., Ltd., product name: KF-6001, degree of polymerization: 20, hydroxyl group equivalent: 920 g/mol), 8.29 g (37.3 mmol) of isophorone diisocyanate, and 0.03 g of dibutyltin dilaurate and the mixture was stirred for 48 hours at 25° C. Next, 4.97 g (42.9 mmol) of 2-hydroxyethyl acrylate and 20 mL of methylene chloride were added and the mixture was stirred for 96 hours at 25° C. under a nitrogen flow. When the reaction had ended, the product was washed with 200 mL of distilled water and dried with anhydrous sodium sulfate. The solvent was distilled off, yielding the targeted compound (40 g).

The compound obtained was confirmed to have the structure indicated below. The number average molecular weight as measured by gel permeation chromatography was 2,400 (polystyrene conversion).

The measurement conditions of the gel permeation chromatography were as follows:

Column: Shodex KF-402.5 HG, two columns
Eluent: THF
Flow rate: 0.3 mL/min
Detector RI
Column temperature: 40° C.

Synthesis Example 4

Synthesis of Macromer B

To a three-necked 100 mL capacity flask were charged 35 g of two-terminal carbinol-modified polydimethyl siloxane (Shin-Etsu Chemical Co., Ltd., product name: KF-6001, degree of polymerization: 20, hydroxyl group equivalent: 920 g/mol), 8.29 g (37.3 mmol) of isophorone diisocyanate, and 0.03 g of dibutyltin dilaurate. The mixture was then stirred for 48 hours at 25° C. under a nitrogen flow. Next, 13.6 g of polyethylene glycol monoacrylate (NOF Corporation, product name: Bremmer AE-200, hydroxyl group equivalent: 317 g/mol) and 20 mL of methylene chloride were added and the mixture was stirred for 120 hours at 25° C. under a nitrogen flow. When the reaction had ended, the product was washed with 200 mL of distilled water and dried with anhydrous sodium sulfate. The solvent was distilled off, yielding the targeted compound (45 g).

[Chem. 38]

(E5)

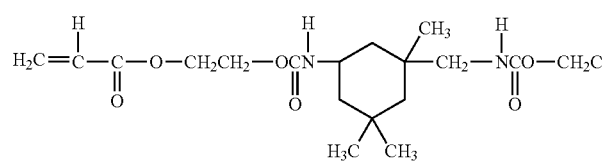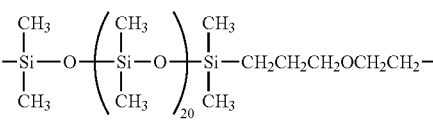
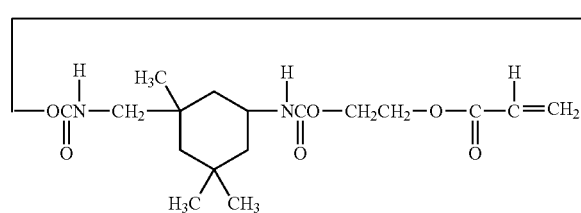

The compound obtained was confirmed to have the structure indicated below. The number average molecular weight as measured by gel permeation chromatography was 2,550 (polystyrene conversion).

[Chem. 39]

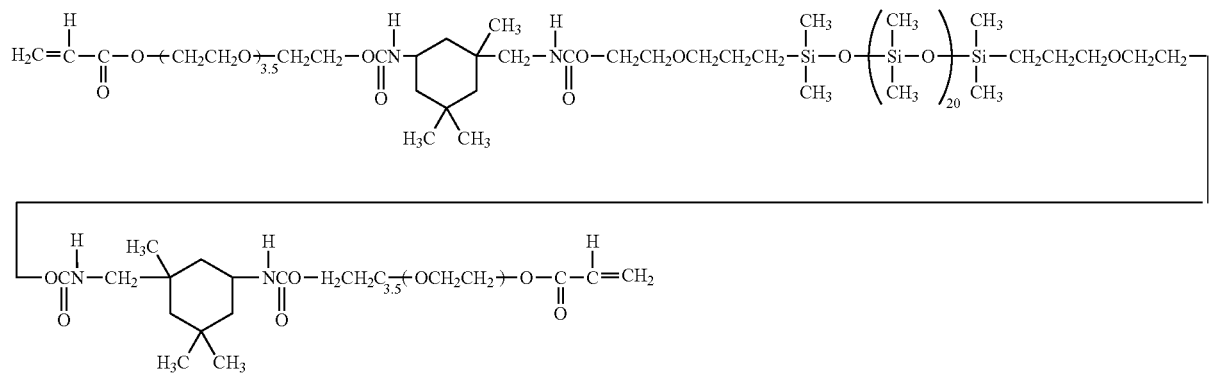

(E6)

Embodiment 1

Example Using Polymerization Initiator with 10-Hour Half-Life Temperature of 70° or Greater and 100° or Lower To a 20 mL capacity brown glass flask were charged 1.5 g (15 mass %) of Macromer A obtained in Synthesis Example 3, 3 g (30 mass %) of 3Si-GMA, 0.5 g (5 mass %) of HEMA, 5 g (50 mass %) of NVP, 0.03 g of 4G (0.3 mass % relative to the combined quantity of Macromer A, 3Si-GMA, HEMA, and NVP), 0.03 g of TEGDVE (0.3 mass % relative to the combined quantity of Macromer A, 3Si-GMA, HEMA, and NVP), and 0.06 g of perbutyl O (0.6 mass % relative to the combined quantity of Macromer A, 3Si-GMA, HEMA, and NVP) and the mixture was stirred for about 16 hours at room temperature. This mixed monomer solution was injected into a two-sided polypropylene casting mold for fabricating contact lenses (contact angle of cavity surface 105°). The upper and lower molds were combined and the assembly was placed in a pressurized polymerization reactor. The interior of the polymerization reactor was backfilled with nitrogen for 20 minutes and polymerization was conducted according to the polymerization schedule indicated below under conditions of 0.2 kgf/cm$^2$.

[Gelling Conditions]

The temperature was raised from room temperature to 50° C. over 10 minutes and then maintained at 50° C. for 8 hours.

[Curing Conditions]

When the gelling conditions had ended, the temperature was raised to 80° C. over 5 minutes and then maintained at 80° C. for two hours. The temperature was then raised from 80° C. to 100° C. over 10 minutes, maintained at 100° C. for 40 minutes, raised from 100° C. to 120° C. over 10 minutes, maintained at 120° C. for one hour, and polymerization was ended.

Following polymerization, the lens was removed from the mold and immersed for 4 hours in a 50 vol % ethanol aqueous solution. It was then placed in distilled water followed by soft contact lens rinse solution (made by Hoya, product name: Pure Soak S), yielding a soft contact lens. The soft contact lens obtained was used to conduct the following evaluation and measurement. The results are given in Table 1. The contact angle of the contact lens obtained was 50°. It had a hydrophilic surface.

[Properties of the Mixed Monomer Solution]

A portion of the mixed monomer solution prior to polymerization was placed in a transparent glass flask and evaluated visually on the following evaluation scale.

Evaluation Scale

G (Good): The mixed monomer solution dissolved uniformly

B (Bad): The mixed monomer solution separated into two phases and did not dissolve

[Evaluation of External Appearance]

The soft contact lens obtained was visually evaluated for external appearance on the following evaluation scale.

Evaluation Scale

G (Good): The lens was transparent and exhibited a round shape

B (Bad): The lens was cloudy, or transparent but exhibited a distorted shape, rendering it unsuitable as a contact lens

[Water Content]

The hydrated weight (Ww) of the soft contact lens following equilibrium swelling at 23° C. and the weight (Wd) in a dry state after having been dried for 4 hours at 70° in a vacuum dryer were measured and the water content was calculated from the following equation:

Water content (%)=(Ww−Wd)/Ww×100

[Coefficient of Oxygen Permeability]

The coefficient of oxygen permeability was measured by a measurement method based on the polarographic method of ISO 18369-4 using lenses of different thickness. An 02 Permometer Model 201T from Rehder Development Company was used in the measurement. The lens thickness was plotted on the X axis and the t/Dk value obtained based on measurement was plotted on the Y axis. The inverse of the slope of the regression line was adopted as the coefficient of oxygen permeation.

[Contact Angle Measurement (Drop Method)]

The water wettability of the surface of the soft contact lens was evaluated by contact angle measurement. Moisture was wiped off the surface of the contact lens, the lens was mounted on a holding base, and the contact angle was measured by the drop method employing pure water. A contact angle meter made by Kyowa Interface Science was employed in the measurement. The drop size was made about 1.5 mm with a syringe. The smaller the value, the better the water wettability indicated.

[Analysis of Surface Composition]

The soft contact lens that had been hydrated was dried again and the types and quantities of elements that were present on the contact lens surface (to a depth of several tens of nm) were analyzed by XPS. The measurement locus was near the center of the front curved surface of the soft contact lens. The composition ratio of the surface is given in atomic %.

The XPS measurement conditions were as follows:
X-ray irradiation: Al—Kα monochrome φ100 μm
Photoelectron takeoff angle: 45 degrees
Charge neutralization: 10 V Ar ion+20 μA electron beams simultaneously irradiated Embodiment 2

With the exceptions that in the monomer composition of the soft contact lens, the polymerization initiator was changed to V-40 and the gelling conditions were changed as indicated below, a lens was fabricated in the same manner as in Embodiment 1. The contact angle of the contact lens obtained was 40°, and it had a hydrophilic surface (Table 1).

[Gelling Conditions]

The temperature was raised from room temperature to 55° C. over 10 minutes, maintained for 8 hours at 55° C., raised from 55° C. to 80° C. over 5 minutes, and maintained for 2 hours at 80° C.

[Curing Conditions]

When the gelling conditions had ended, the temperature was raised to 100° C. over 10 minutes, maintained for 40 minutes at 100° C., raised from 100° C. to 120° C. over 10 minutes, and maintained for one hour at 120° C. to complete polymerization.

Embodiment 3

With the exceptions that in the monomer composition of the soft contact lens, the polymerization initiator was changed to Perhexa HC and the gelling conditions were changed as stated below, a lens was fabricated in the same manner as in Embodiment 1. The contact angle of the contact lens obtained was 33°, and it had a hydrophilic surface (Table 1).

[Gelling Conditions]
Identical to those in Embodiment 2.
[Curing Conditions]
Identical to those in Embodiment 2.

Embodiment 4

With the exceptions that in the monomer composition of the soft contact lens, the polymerization initiator was changed to Perhexyl I and the gelling conditions were changed as stated below, a lens was fabricated in the same manner as in Embodiment 1. The contact angle of the contact lens obtained was 53°, and it had a hydrophilic surface (Table 1).

[Gelling Conditions]

The temperature was raised from room temperature to 70° C. over 10 minutes, maintained for 8 hours at 70° C., raised from 70° C. to 80° C. over 5 minutes, and maintained for 2 hours at 80° C.

[Curing Conditions]
Identical to those in Embodiment 2.

Comparative Example 1

Example Employing Polymerization Initiator with T10 of Less than 70°

With the exceptions that in the monomer composition of the soft contact lens, the polymerization initiator was changed to V-65, a lens was fabricated in the same manner as in Embodiment 1. The ratio of elemental nitrogen thought to be derived from N-vinyl-2-pyrrolidone on the surface of the contact lens obtained was low, but a large amount of elemental silicon derived from silicone components was distributed. The contact angle of the contact lens obtained was 102°, giving it poor water wettability (Table 1).

Comparative Example 2

Example Employing Polymerization Initiator with T10 of Less than 70°

With the exceptions that in the monomer composition of the soft contact lens, the polymerization initiator was changed to V-60, a lens was fabricated in the same manner as in Embodiment 1. The ratio of elemental nitrogen thought to be derived from N-vinyl-2-pyrrolidone on the surface of the contact lens obtained was low, but a large amount of elemental silicon derived from silicone components was distributed. The contact angle of the contact lens obtained was 102°, giving it poor water wettability (Table 1).

Comparative Example 3

Example Employing Polymerization Initiator with T10 of Greater than 100° C.

With the exceptions that in the monomer composition of the soft contact lens, the polymerization initiator was changed to V-30 and the gelling conditions were changed as stated below, a lens was fabricated in the same manner as in Embodiment 1. The contact lens obtained was brittle and could not be removed from the mold (Table 1).

[Gelling Conditions]

The temperature was raised from room temperature to 70° C. over 10 minutes, maintained for 8 hours at 70° C., raised from 70° C. to 80° C. over 5 minutes, and maintained for 2 hours at 80° C. The temperature was further raised from 80° C. to 100° C. over 10 minutes, and maintained for 40 minutes at 100° C.

[Curing Conditions]

When the gelling conditions had ended, the temperature was raised from 100° C. to 120° C. over 10 minutes, and maintained for one hour at 120° C. to complete polymerization.

TABLE 1

| | Component | Embodiment 1 | Embodiment 2 | Embodiment 3 | Embodiment 4 |
|---|---|---|---|---|---|
| (a) | 3Si-GMA | 30 | 30 | 30 | 30 |
| (b) | NVP | 50 | 50 | 50 | 50 |
| (e) | Macromer A | 15 | 15 | 15 | 15 |
| (g) | HEMA | 5 | 5 | 5 | 5 |
| (c) | TEGDVE | 0.3 | 0.3 | 0.3 | 0.3 |
| | 4G | 0.3 | 0.3 | 0.3 | 0.3 |
| (d) | Perbutyl O | 0.6 | | | |
| | V-40 | | 0.6 | | |
| | Perhexa HC | | | 0.6 | |
| | Perhexyl I | | | | 0.6 |
| (h) | V-65 | | | | |
| | V-60 | | | | |
| | V-30 | | | | |
| | Gelling conditions | 50° C., 8 hrs | 55° C., 8 hrs + 80° C., 2 hrs | 55° C., 8 hrs + 80° C., 2 hrs | 70° C., 8 hrs + 80° C., 2 hrs |
| | Water content (%) | 42 | 42 | 43 | 41 |
| Relative | C (atomic %) | 66.5 | 69.6 | 69.8 | 67.5 |
| element | N (atomic %) | 5.2 | 5.5 | 6.7 | 5.0 |
| content | O (atomic %) | 19.9 | 18.4 | 17.2 | 19.4 |
| | Si (atomic %) | 8.3 | 6.5 | 6.2 | 8.1 |
| | Contacting angel (°) | 50 | 40 | 33 | 53 |

| | Component | Comparative Example 1 | Comparative Example 2 | Comparative Example 3 |
|---|---|---|---|---|
| (a) | 3Si-GMA | 30 | 30 | 30 |
| (b) | NVP | 50 | 50 | 50 |
| (e) | Macromer A | 15 | 15 | 15 |
| (g) | HEMA | 5 | 5 | 5 |
| (c) | TEGDVE | 0.3 | 0.3 | 0.3 |
| | 4G | 0.3 | 0.3 | 0.3 |
| (d) | Perbutyl O | | | |
| | V-40 | | | |
| | Perhexa HC | | | |
| | Perhexyl I | | | |
| (h) | V-65 | 0.6 | | |
| | V-60 | | 0.6 | |
| | V-30 | | | 0.6 |
| | Gelling conditions | 50° C., 8 hrs | 50° C., 8 hrs | 70° C., 8 hrs + 80° C., 2 hrs + 100° C., 40 min |
| | Water content (%) | 42 | 42 | The contact lens obtained was brittle and could not be removed from the mold |
| Relative | C (atomic %) | 62.6 | 63.7 | |
| element | N (atomic %) | 2.9 | 3.1 | |
| content | O (atomic %) | 22.6 | 22.4 | |
| | Si (atomic %) | 11.9 | 10.8 | |
| | Contacting angel (°) | 102 | 102 | |

In the table, the unit of the composition is shown by mass %.
Crosslinkable monomer (component c) and polymerization initiator (components d and h) are shown as a ratio to the total amount of monomers (components a, b, e and g).

As shown in Table 1, in Embodiments 1 to 4, in which polymerization initiators having a T10 of 70° C. or greater and 100° C. or less were employed, and in which the gelling conditions were such that the temperature was maintained for at least one hour within a range of from the T10 of the polymerization initiator to a temperature 35° C. lower than the T10 (step P1) and the curing conditions were such that the temperature was maintained higher than the T10 of the polymerization initiator for one hour or more (step P2), it was possible to reduce the amount of elemental silicon derived from the silicone components on the surface of the contact lens, making it possible to obtain a contact lens having a hydrophilic surface without any post-processing following polymerization. Additionally, in Comparative Examples 1 and 2, in which polymerization initiators with T10s of less than 70° C. were employed under the same conditions, large amounts of elemental silicon derived from silicone components were distributed on the surfaces of the lenses, compromising water wettability. In Comparative Example 3, in which a polymerization initiator with a T10 exceeding 100° C. was employed, the lens was brittle following polymerization and could not be removed from the mold.

Embodiment 5

Example Using Polymerization Initiator with a T10 of 700 or Greater and 100° or Lower To a 20 mL capacity brown glass flask were charged 1.5 g (15 mass %) of Macromer B obtained in Synthesis Example 4, 2.5 g (25 mass %) of 3Si-GMA, 0.8 g (8 mass %) of FM-0711, 0.5 g (5 mass %) of HEMA, 4.7 g (47 mass %) of NVP, 0.05 g of 4G (0.5 mass % relative to the combined quantity of Macromer B, 3Si-GMA, FM-0711, HEMA, and NVP), 0.03 g of BDVE (0.3 mass % relative to the combined quantity of Macromer B, 3Si-GMA, FM-0711, HEMA, and NVP), and 0.06 g of perbutyl O (0.6 mass % relative to the combined quantity of Macromer B, 3Si-GMA, FM-0711, HEMA, and NVP) and the mixture was stirred for about 16 hours at room temperature. This mixed monomer solution was injected into a two-sided polypropylene casting mold for fabricating contact lenses. The upper and lower molds were combined and the assembly was placed in a pressurized polymerization reactor. The interior of the polymerization reactor was backfilled with nitrogen for 20 minutes and polymerization was conducted according to the polymerization schedule indicated below under conditions of 0.2 kgf/cm$^2$.

[Gelling Conditions]

The temperature was raised from room temperature to 50° C. over 10 minutes, and maintained for 8 hours at 50° C.

[Curing Conditions]

Identical to those in Embodiment 2.

Following polymerization, the lens was removed from the mold and immersed for 4 hours in a 50 vol % ethanol aqueous solution. It was then placed in distilled water followed by a soft contact lens rinse solution (made by Hoya Corporation, product name: Pure Soak S), yielding a soft contact lens. The results are given in Table 2. The contact angle of the contact lens obtained was 48°. It had a hydrophilic surface.

Embodiment 6

With the exceptions that in the monomer composition of the soft contact lens, the polymerization initiator was changed to V-40 and the gelling conditions were changed as stated below, a lens was fabricated in the same manner as in Embodiment 5. The contact angle of the contact lens obtained was 40°. It had a hydrophilic surface (Table 2).

[Gelling Conditions]

The temperature was raised from room temperature to 60° C. over 10 minutes, maintained for 8 hours at 60° C., raised from 60° C. to 80° C. over 5 minutes, and maintained for 2 hours at 80° C.

[Curing Conditions]

Identical to those in Embodiment 2.

Embodiment 7

With the exceptions that in the monomer composition of the soft contact lens, the polymerization initiator was changed to Perhexa HC and the gelling conditions were changed as stated below, a lens was fabricated in the same manner as in Embodiment 6. The contact angle of the contact lens obtained was 32°. It had a hydrophilic surface (Table 2).

[Gelling Conditions]

The temperature was raised from room temperature to 60° C. over 10 minutes, maintained for 8 hours at 60° C., raised from 60° C. to 80° C. over 5 minutes, and maintained for 2 hours at 80° C.

[Curing Conditions]

Identical to those in Embodiment 2.

Embodiment 8

With the exceptions that in the monomer composition of the soft contact lens, the polymerization initiator was changed to Perhexyl I and the gelling conditions were changed as stated below, a lens was fabricated in the same manner as in Embodiment 5. The contact angle of the contact lens obtained was 44°. It had a hydrophilic surface (Table 2).

[Gelling Conditions]

The temperature was raised from room temperature to 65° C. over 10 minutes, maintained for 8 hours at 65° C., raised from 60° C. to 80° C. over 5 minutes, and maintained for 2 hours at 80° C.

[Curing Conditions]

Identical to those in Embodiment 2.

Comparative Example 4

Example Employing a Polymerization Initiator with a T10 of Less than 70° C.

With the exception that in the monomer composition of the soft contact lens, the polymerization initiator was changed to V-65, a lens was fabricated in the same manner as in Embodiment 5. The contact lens obtained was not round, exhibiting a distorted shape. It was thus unsuitable as a contact lens (Table 2).

Comparative Example 5

Example Employing a Polymerization Initiator with a T10 of Less than 70° C.

With the exception that in the monomer composition of the soft contact lens, the polymerization initiator was changed to V-60, a lens was fabricated in the same manner as in Embodiment 5. The contact lens obtained was not round, exhibiting a distorted shape. It was thus unsuitable as a contact lens (Table 2).

Comparative Example 6

Example Employing a Polymerization Initiator with a T10 Exceeding 100° C.

With the exceptions that in the monomer composition of the soft contact lens, the polymerization initiator was changed to V-30 and the gelling conditions were changed as stated below, a lens was fabricated in the same manner as in Embodiment 5. The contact lens obtained was brittle and could not be removed from the mold (Table 2).

[Gelling Conditions]

The temperature was raised from room temperature to 65° C. over 10 minutes, maintained for 8 hours at 65° C., raised from 65° C. to 80° C. over 5 minutes, and maintained for 2 hours at 80° C. The temperature was further raised from 80° C. to 100° C. over 10 minutes, and maintained for 40 minutes at 100° C.

[Curing Conditions]

When the gelling conditions had ended, the temperature was raised from 100° C. to 120° C. over 10 minutes, and maintained for one hour at 120° C. to complete polymerization.

TABLE 2

|  | Component | Embodiment 5 | Embodiment 6 | Embodiment 7 | Embodiment 8 |
|---|---|---|---|---|---|
| (a) | 3Si-GMA | 25 | 25 | 25 | 25 |
| (b) | NVP | 47 | 47 | 47 | 47 |
| (e) | Macromer B | 15 | 15 | 15 | 15 |
|  | FM-0711 | 8 | 8 | 8 | 8 |
| (g) | HEMA | 5 | 5 | 5 | 5 |
| (c) | BDVE | 0.3 | 0.3 | 0.3 | 0.3 |
|  | 4G | 0.5 | 0.5 | 0.5 | 0.5 |
| (d) | Perbutyl O | 0.6 |  |  |  |
|  | V-40 |  | 0.6 |  |  |
|  | Perhexa HC |  |  | 0.6 |  |
|  | Perhexyl I |  |  |  | 0.6 |
| (h) | V-65 |  |  |  |  |
|  | V-60 |  |  |  |  |
|  | V-30 |  |  |  |  |
|  | Gelling conditions | 50° C., 8 hrs | 60° C., 8 hrs + 80° C., 2 hrs | 60° C., 8 hrs + 80° C., 2 hrs | 65° C., 8 hrs + 80° C., 2 hrs |
|  | Evaluation of external appearance | G | G | G | G |
|  | Water content (%) | 44 | 43 | 44 | 43 |
|  | Contacting angel (°) | 48 | 40 | 32 | 44 |

|  | Component | Comparative Example 4 | Comparative Example 5 | Comparative Example 6 |
|---|---|---|---|---|
| (a) | 3Si-GMA | 25 | 25 | 25 |
| (b) | NVP | 47 | 47 | 47 |
| (e) | Macromer B | 15 | 15 | 15 |
|  | FM-0711 | 8 | 8 | 8 |
| (g) | HEMA | 5 | 5 | 5 |
| (c) | BDVE | 0.3 | 0.3 | 0.3 |
|  | 4G | 0.5 | 0.5 | 0.5 |
| (d) | Perbutyl O |  |  |  |
|  | V-40 |  |  |  |
|  | Perhexa HC |  |  |  |
|  | Perhexyl I |  |  |  |
| (h) | V-65 | 0.6 |  |  |
|  | V-60 |  | 0.6 |  |
|  | V-30 |  |  | 0.6 |
|  | Gelling conditions | 50° C., 8 hrs | 50° C., 8 hrs | 65° C., 8 hrs + 80° C., 2 hrs + 100° C., 40 min |
|  | Evaluation of external appearance | B | B | The contact lens obtained was brittle and could not be removed from the mold |
|  | Water content (%) | — | — |  |
|  | Contacting angel (°) | — | — |  |

In the table, the unit of the composition is shown by mass %.
Crosslinkable monomer (component c) and polymerization initiator (components d and h) are shown as a ratio to the total amount of monomers (components a, b, e and g).

As shown in Table 2, in Embodiments 5 to 8, in which polymerization initiators having a T10 of 70° C. or greater and 100° C. or less were employed, and in which the gelling conditions were such that the temperature was maintained for at least one hour within a range of from the T10 of the polymerization initiator to a temperature 35° C. lower than the T10 (step P1) and the curing conditions were such that the temperature was maintained higher than the T10 of the polymerization initiator for one hour or more (step P2), it was possible to obtain contact lenses having hydrophilic surfaces without any post-processing following polymerization. Additionally, in Comparative Examples 4 and 5, in which polymerization initiators with T10s of less than 70° C. were employed under the same conditions, the lenses deformed and were not suitable as contact lenses. In Comparative Example 6, in which a polymerization initiator with a T10 exceeding 100° C. was employed, the lens was brittle following polymerization and could not be removed from the mold.

Embodiments 9 to 12 and Comparative Examples 7 and 8

In which the Structure of the Silicone Monomer was Varied while Using a Polymerization Initiator with a T10 of 70° C. or Greater and 100° C. or Less Mixed monomer solutions were prepared with the compositions indicated in Table 3 and lenses were fabricated in the same manner as in Embodiment 1. The gelling conditions and curing conditions were as set forth below.

[Gelling Conditions]
The temperature was raised from room temperature to 60° C. over 10 minutes, maintained for 8 hours at 60° C., raised from 60° C. to 80° C. over 5 minutes, and maintained for 2 hours at 80° C.

[Curing Conditions]

Identical to those in Embodiment 2.

TABLE 3

|   | Component | Embodiment 9 | Embodiment 10 | Embodiment 11 | Embodiment 12 |
|---|---|---|---|---|---|
| (a) | 3Si-GMA | 40 | | | |
|   | 4Si-GMA | | 40 | | |
|   | 4Si-4PEG | | | 40 | |
|   | 4Si-6PEG | | | | 40 |
| (b) | NVP | 50 | 50 | 50 | 50 |
| (e) | Macromer A | 10 | 10 | 10 | 10 |
| (f) | TRIS | | | | |
|   | MCR-M07 | | | | |
| (c) | TEGDVE | 0.3 | 0.3 | 0.3 | 0.3 |
|   | EDMA | 0.2 | 0.2 | 0.2 | 0.2 |
| (d) | V-40 | 0.6 | 0.6 | 0.6 | 0.6 |
|   | Gelling conditions | 60° C., 8 hrs + 80° C., 2 hrs | 60° C., 8 hrs + 80° C., 2 hrs | 60° C., 8 hrs + 80° C., 2 hrs | 60° C., 8 hrs + 80° C., 2 hrs |
|   | Properties of monomer mixing solution | G | G | G | G |
|   | Evaluation of external appearance | G | G | G | G |
|   | Water content (%) | 40 | 38 | 45 | 49 |
|   | Oxygen permeability [1] | 70 | 110 | 74 | 65 |
|   | Contacting angel (°) | 38 | 30 | 20 | 14 |

|   | Component | Comparative Example 7 | Comparative Example 8 |
|---|---|---|---|
| (a) | 3Si-GMA | | |
|   | 4Si-GMA | | |
|   | 4Si-4PEG | | |
|   | 4Si-6PEG | | |
| (b) | NVP | 50 | 50 |
| (e) | Macromer A | 10 | 10 |
| (f) | TRIS | 40 | |
|   | MCR-M07 | | 40 |
| (c) | TEGDVE | 0.3 | 0.3 |
|   | EDMA | 0.2 | 0.2 |
| (d) | V-40 | 0.6 | 0.6 |
|   | Gelling conditions | 60° C., 8 hrs + 80° C., 2 hrs | — |
|   | Properties of monomer mixing solution | G | B |
|   | Evaluation of external appearance | B | — |
|   | Water content (%) | — | — |
|   | Oxygen permeability [1] | — | — |
|   | Contacting angel (°) | — | — |

In the table, the unit of the composition is shown by mass %.
Crosslinkable monomer (component c) and polymerization initiator (component d) are shown as a ratio to the total amount of monomers (components a, b, e and f).
[1] ×$10^{-11}$(cm$^2$/sec) · (mLO$_2$/mL × mmHg)

As shown in Table 3, when a silicone monomer was employed that contained four silicon atoms and had at least one hydroxyl group or four polyethylene glycol groups in the molecular structure thereof, it was possible to obtain a contact lens that was transparent and had a hydrophilic surface. When a silicone monomer was employed that had four or more silicon atoms but did not contain a hydroxyl group or polyethylene glycol groups in the molecular structure thereof, the contact lens obtained clouded when hydrated and was unsuitable as a contact lens, or it was impossible to obtain a homogeneous mixed monomer solution.

Embodiments 13 to 20

With the exception that the mixed monomer solution was prepared with the composition indicated in Table 4, lenses were fabricated in the same manner as in Embodiment 1. The gelling conditions and curing conditions were as set forth below.

[Gelling Conditions]

The temperature was raised from room temperature to 55° C. over 10 minutes, maintained for 8 hours at 55° C., raised from 55° C. to 80° C. over 5 minutes, and maintained for 2 hours at 80° C.

[Curing Conditions]

Identical to those in Embodiment 2.

TABLE 4

| | Component | Embodiment 13 | Embodiment 14 | Embodiment 15 | Embodiment 16 |
|---|---|---|---|---|---|
| (a) | 3Si-GMA | 35 | 35 | | 40 |
| | 4Si-GMA | 20 | | 35 | |
| | 4Si-4PEG | | 20 | | |
| | 4Si-6PEG | | | 20 | |
| (b) | NVP | 45 | 45 | 45 | |
| | VMA | | | | 47 |
| (e) | Macromer A | | | | 10 |
| | Macromer B | | | | |
| | FM-0711 | | | | |
| (f) | TRIS | | | | |
| (g) | HEMA | | | | 3 |
| | DMAA | | | | |
| | 2-MEA | | | | |
| (c) | TEGDVE | | 0.5 | 0.3 | 0.3 |
| | BDVE | 0.3 | | | |
| | TAIC | | | | |
| | EDMA | | | | |
| | 4G | 1 | 0.5 | 0.5 | 0.3 |
| (d) | V-40 | 0.5 | 0.6 | | 0.6 |
| | Perhexa HC | | | 0.6 | |
| (h) | Darocur 1173 | | | | |
| | Gelling conditions | 55° C., 8 hrs + 80° C., 2 hrs | 55° C., 8 hrs + 80° C., 2 hrs | 55° C., 8 hrs + 80° C., 2 hrs | 55° C., 8 hrs + 80° C., 2 hrs |
| | Properties of monomer mixing solution | G | G | G | G |
| | Evaluation of external appearance | G | G | G | G |
| | Water content (%) | 38 | 43 | 45 | 43 |
| | Oxygen permeability [1] | 91 | 75 | 80 | 70 |
| | Contacting angel (°) | 47 | 38 | 30 | 32 |

| | Component | Embodiment 17 | Embodiment 18 | Embodiment 19 | Embodiment 20 |
|---|---|---|---|---|---|
| (a) | 3Si-GMA | 40 | 20 | 30 | 33 |
| | 4Si-GMA | | | | |
| | 4Si-4PEG | | | | |
| | 4Si-6PEG | | | | |
| (b) | NVP | | 53 | 47 | 50 |
| | VMA | 47 | | | |
| (e) | Macromer A | | 20 | | 5 |
| | Macromer B | 10 | | 5 | |
| | FM-0711 | | | 15 | 7 |
| (f) | TRIS | | | | |
| (g) | HEMA | 3 | 7 | 3 | 5 |
| | DMAA | | | | |
| | 2-MEA | | | | |
| (c) | TEGDVE | 0.3 | | | |
| | BDVE | | | 0.3 | 0.3 |
| | TAIC | | 0.04 | | |
| | EDMA | | | | |
| | 4G | 0.3 | 0.2 | 0.5 | 0.5 |
| (d) | V-40 | 0.6 | | | 0.6 |
| | Perhexa HC | | 0.6 | 0.6 | |
| (h) | Darocur 1173 | | | | |
| | Gelling conditions | 55° C., 8 hrs + 80° C., 2 hrs | 55° C., 8 hrs + 80° C., 2 hrs | 55° C., 8 hrs + 80° C., 2 hrs | 55° C., 8 hrs + 80° C., 2 hrs |
| | Properties of monomer mixing solution | G | G | G | G |
| | Evaluation of external appearance | G | G | G | G |
| | Water content (%) | 47 | 43 | 45 | 48 |
| | Oxygen permeability [1] | 65 | 68 | 118 | 77 |
| | Contacting angel (°) | 29 | 51 | 38 | 42 |

| | Component | Comparative Example 9 | Comparative Example 10 | Comparative Example 11 | Comparative Example 12 |
|---|---|---|---|---|---|
| (a) | 3Si-GMA | 40 | | 33 | 33 |
| | 4Si-GMA | | | | |
| | 4Si-4PEG | | | | |
| | 4Si-6PEG | | | | |
| (b) | NVP | 27 | 20 | 50 | 50 |
| | VMA | | | | |

TABLE 4-continued

|   |   | | | | |
|---|---|---|---|---|---|
| (e) | Macromer A | 10 | 30 | 5 | 5 |
|   | Macromer B | | | | |
|   | FM-0711 | | | 7 | 7 |
| (f) | TRIS | | 30 | | |
| (g) | HEMA | 3 | | 5 | 5 |
|   | DMAA | 20 | | | |
|   | 2-MEA | | 20 | | |
| (c) | TEGDVE | 0.3 | | | |
|   | BDVE | | | 0.3 | 0.3 |
|   | TAIC | | | | |
|   | EDMA | | 0.4 | | |
|   | 4G | 0.3 | | 0.5 | 0.5 |
| (d) | V-40 | 0.6 | | 0.6 | 0.6 |
|   | Perhexa HC | | | | |
| (h) | Darocur 1173 | | 0.4 | | |
|   | Gelling conditions | 55° C., 8 hrs + 80° C., 2 hrs | Photo polymerization | 55° C., 40 min + 80° C., 40 min | 80° C., 90 min |
|   | Properties of monomer mixing solution | G | G | G | G |
|   | Evaluation of external appearance | G | G | B | The contact lens obtained was brittle and could not be removed from the mold |
|   | Water content (%) | — | — | — | |
|   | Oxygen permeability [1] | — | — | — | |
|   | Contacting angel (°) | 106 | 105 | — | |

In the table, the unit of the composition is shown by mass %.
Crosslinkable monomer (component c) and polymerization initiator (components d and h) are shown as a ratio to the total amount of monomers (components a, b, e, f and g).
[1] $\times 10^{-11} (cm^3/sec) \cdot (mLO_2/mL \times mmHg)$ Comparative Example 9

With the exception that the mixed monomer solution was prepared with the composition indicated in Table 4, a lens was fabricated in the same manner as in Embodiment 13. The lens obtained contained N,N-dimethylacrylamide as a constituent lens component, and thus exhibited poor surface water wettability.

Comparative Example 10

A mixed monomer solution was prepared with the composition indicated in Table 4. The mixed monomer solution was injected into a two-sided polypropylene casting mold for fabricating contact lenses and the upper and lower molds were combined. The mold was irradiated for 20 minutes with light at an intensity of 11 mW/cm² over an area of 280 to 390 nm to complete polymerization. The lens that was obtained exhibited poor surface water wettability.

Comparative Example 11

A mixed monomer solution of the same composition as that of Embodiment 20 was prepared. The mixed monomer solution was injected into a two-sided polypropylene casting mold for fabricating contact lenses, the upper and lower molds were combined, and the assembly was placed in a pressurized polymerization reactor. The interior of the polymerization reactor was backfilled with nitrogen over 30 minutes, after which polymerization was conducted according to the following polymerization schedule under conditions of 0.2 kgf/cm².
[Gelling Conditions]
The temperature was raised from room temperature to 55° C. over 20 minutes, maintained for 40 minutes at 55° C., raised from 55° C. to 80° C. over 5 minutes, and then maintained at 50° C. for 40 minutes.
[Curing Conditions]
When the gelling conditions had ended, the temperature was then raised from 80° C. to 100° C. over 10 minutes, maintained at 100° C. for 40 minutes, and polymerization was ended.

Following polymerization, the lens was removed from the mold, immersed for 4 hours in a 50 vol % ethanol aqueous solution, and placed in distilled water followed by a soft contact lens-use rinse solution (made by HOYA Corporation, product name: Pure Soak S) to obtain a soft contact lens. The contact lens obtained was not round, exhibited shape deformity, and was unsuitable as a contact lens.

Comparative Example 12

With the exceptions that a mixed monomer solution identical in composition to that of Embodiment 20 was prepared and the gelling conditions were changed as indicated below, a lens was fabricated in the same manner as in Comparative Example 11. The contact lens obtained was brittle and could not be removed from the lens.
[Gelling Conditions]
The temperature was raised from room temperature to 80° C. over 25 minutes, and then maintained at 80° C. for 90 minutes, and polymerization was completed.

As shown in Table 4, in Embodiments 13 to 20, in which polymerization initiators having a T10 of 70° C. or greater and 100° C. or less were employed, and in which the gelling conditions were such that the temperature was maintained for at least one hour within a range of from the T10 of the polymerization initiator to a temperature 35° C. lower than the T10 (step P1) and the curing conditions were such that the temperature was maintained higher than the T10 of the polymerization initiator for one hour or more (step P2), it was possible to obtain silicone hydrogel contact lenses having hydrophilic surfaces without any post-processing following polymerization.

By contrast, Comparative Example 9, which contained N,N-dimethylacrylamide as a monomer constituent component, was a lens with poor surface water wettability that was unsuitable as a contact lens without post-processing following polymerization. In Comparative Example 10 as well, in which the photopolymerization method was adopted, a lens of poor surface water wettability was obtained that was unsuitable as a contact lens without post-processing following polymerization. In Comparative Example 11, even when a polymerization initiator with a T10 of 70° C. or greater and 100° C. or less was employed, when the period of maintenance under curing conditions corresponding to step P2 was less than one hour, the lens deformed and was unsuitable as a contact lens. Further, in Comparative Example 12, even when a temperature falling within a range of from T10 to a temperature 35° C. lower than T10 was maintained for one hour or more but step P2 was not conducted, the lens was brittle following polymerization and could not be removed from the mold.

INDUSTRIAL APPLICABILITY

The present invention is useful in fields relating to contact lenses.

The invention claimed is:

1. A method for fabricating a silicone-containing copolymer molded article comprising a silicone monomer unit, hydrophilic monomer unit, and crosslinking monomer unit, and having a hydrophilic surface;
    by polymerizing a monomer solution containing (a) at least one silicone monomer comprising a (meth)acryloyl group; (b) at least one hydrophilic monomer comprising a vinyl group; (c) at least one crosslinkable monomer; and (d) at least one polymerization initiator;
    in a cavity of a mold having a hydrophobic cavity surface;
    wherein the polymerization initiator has a 10-hour half-life temperature (abbreviated to T10 hereinafter) of 70° C. or higher and 100° C. or lower, and
    the polymerization is conducted by means of a step P1 of maintaining a temperature within a range of from the T10 of the polymerization initiator contained in the monomer solution to 35° C. below T10 for one hour or more; and a step P2 of maintaining a temperature higher than the T10 of the polymerization initiator contained in the monomer solution for one hour or more.

2. The method according to claim 1, wherein the temperature maintained in step P1 is in a temperature range of from a temperature 10° C. lower than T10 to a temperature 35° C. lower than T10.

3. The method according to claim 1, wherein the temperature maintained in step P2 is in a temperature range of from a temperature 5° C. higher than T10 to a temperature 50° C. higher than T10.

4. The method according to claim 1, wherein the polymerization initiator is an azo polymerization initiator or an organic peroxide polymerization initiator.

5. The method according to claim 1, wherein the content of silicone monomer (a) units in the silicon-containing copolymer molded article is in a range of 20 to 56 mass %, the content of hydrophilic monomer (b) units is in a range of 40 to 60 mass %, and the content of crosslinkable monomer (c) units is in a range of 0.02 to 4 mass %.

6. The method according to claim 1, wherein silicone monomer (a) is at least one monomer selected from the group consisting of (a1) and (a2) below:
    (a1) one or two or more silicone monomers containing at least one hydroxyl group and 1 to 4 silicon atoms per molecule; and
    (a2) one or two or more silicone monomers containing at least one polyethylene glycol group and 1 to 4 silicon atoms per molecule.

7. The method according to claim 6, wherein silicone monomer (a1) is a monomer denoted by general formula (a1-1) or (a1-2) below:

[Chem. 1]

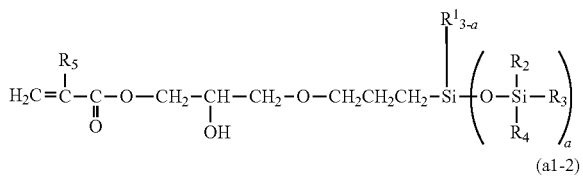

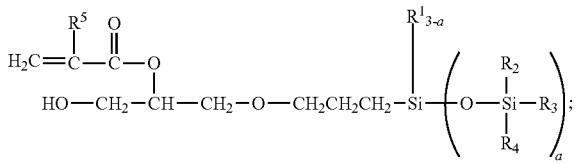

wherein $R^1$, $R^2$, $R^3$, and $R^4$ denote methyl groups, $R^5$ denotes a hydrogen atom or a methyl group, and a denotes an integer of from 1 to 3 and silicone monomer (a2) is a monomer denoted by general formula (a2-1) below:

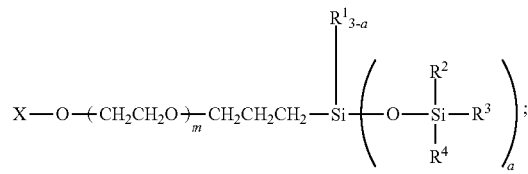

wherein $R^1$, $R^2$, $R^3$, and $R^4$ denote methyl groups, a denotes an integer of from 1 to 3, m is 4 to 8, and X denotes one substituent selected from the substituents denoted by formula (Y1) or (Y2) below, wherein $R^5$ is a hydrogen atom or a methyl group,

[Chem. 3]

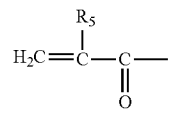

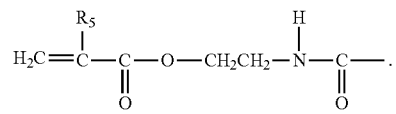

8. The method according to claim 1, wherein hydrophilic monomer (b) is either one, or both, of N-vinyl-2-pyrrolidone and N-vinyl-N-methylacetamide.

9. The method according to claim 1, wherein the crosslinkable monomer (c) is at least one monomer selected from the group consisting of (c1), (c2), and (c3):
    (c1) one or two or more monomers containing two or more vinyl groups per molecule;
    (c2) one or two or more monomers containing two or more allyl groups per molecule; and
    (c3) one or two or more monomers containing two or more (meth)acrylate groups per molecule.

10. The method according to claim 9, wherein the monomer (c1) is one or two or more members selected from the group consisting of 1,4-butanediol divinyl ether, diethylene glycol divinyl ether, and triethylene glycol divinyl ether;
the monomer (c2) is one or two or more members selected from the group consisting of triallyl isocyanurate, trimethylol propane diallyl ether, and pentaerythritol triallyl ether; and
the monomer (c3) is one or two or more monomers selected from the group consisting of ethylene glycol di(meth)acrylate, triethylene glycol di(meth)acrylate, tetraethylene glycol di(meth)acrylate, trimethylol propane tri(meth)acrylate, and ethoxylated trimethylol propane tri(meth)acrylate.

11. The method according to claim 1, wherein the monomer solution further contains at least one supplemental monomer selected from the group consisting of siloxane macromonomers, silicone monomers not containing hydroxyl groups or polyethylene glycol groups in the molecular structures thereof, and monomers not containing silicon atoms in the molecular structures thereof.

12. The method according to claim 1, wherein the hydrophilic surface of the silicone-containing copolymer molded article exhibits a contact angle of 60° or less relative to pure water without the surface of the molded article having been subjected to post-processing to enhance the water wettability of the surface following polymerization, wherein the contact angle is the contact angle of a silicone hydrogel molded article obtained by hydrating the silicone-containing copolymer molded article.

13. The method according to claim 1, wherein the mold having a hydrophobic cavity surface is a two-sided casting mold for use in polyalkylene contact lens molding and the silicone-containing copolymer molded article is a precursor for silicone hydrogel soft contact lens.

14. A silicone-containing copolymer molded article prepared by the method according to claim 1.

15. A silicone-containing copolymer molded article comprised of at least one monomer unit selected from the group consisting of (a1) and (a2), a monomer unit (b), and at least one monomer unit selected from the group consisting of (c1) to (c3) below, wherein molecular structure (g) may further contain monomer units not containing silicon atoms, wherein the monomers not containing silicon atoms in molecular structure (g) are one or more monomers selected from among 2-hydroxyethyl (meth)acrylate, methacrylic acid, methyl (meth)acrylate, ethyl (meth)acrylate, n-butyl (meth)acrylate, 2-methoxyethyl (meth)acrylate, and 2-methacryloyloxyethyl phosphorylcholine); having a hydrophilic surface with a contact angle relative to pure water of 60°, wherein the contact angle is the contact angle of a silicone hydrogel molded article obtained by hydrating a silicone-containing copolymer molded article; wherein the content of silicone monomers (a1) and (a2) units is in a range of 20 to 56 mass %, the content of monomer (b) units is in a range of 40 to 60 mass %, and the content of monomers (c1) to (c3) units is in a range of 0.02 to 4 mass %, and the content of the monomer units not containing silicon atoms in molecular structure (g) is in a range of less than 10 mass %:

(a1) one or two or more units derived from silicone monomers containing at least one hydroxyl group and 1 to 4 silicon atoms per molecule, and having a molecular weight of less than 900;

(a2) one or two or more silicone monomer units containing at least one polyethylene glycol group and 1 to 4 silicon atoms per molecule, and having a molecular weight of less than 900;

(b) one or two or more units derived from hydrophilic monomers having a vinyl group;

(c1) one or two or more monomer units containing two or more vinyl groups per molecule;

(c2) one or two or more monomer units containing two or more allyl groups per molecule; and (c3) one or two or more monomers having two or more (meth)acrylate groups per molecule.

16. A silicone-containing copolymer molded article, comprising at least one monomer unit selected from the group consisting of (a1) and (a2) below, monomer unit (b) below, at least one monomer selected from the group consisting of (c1) to (c3), and the siloxane macromonomer unit denoted by (e); having a hydrophilic surface with a contact angle of 60° or less relative to pure water; and having a water content of 35% or greater but less than 60%, wherein the contact angle and water content are the contact angle and water content of a silicone hydrogel molded article obtained by hydrating the silicone-containing copolymer molded article:

(a1) one or two or more units derived from silicone monomers containing at least one hydroxyl group and 1 to 4 silicon atoms per molecule, and having a molecular weight of less than 900;

(a2) one or two or more silicone monomer units containing at least one polyethylene glycol group and 1 to 4 silicon atoms per molecule, and having a molecular weight of less than 900;

(b) one or two or more units derived from hydrophilic monomers having a vinyl group;

(c1) one or two or more monomer units containing two or more vinyl groups per molecule;

(c2) one or two or more monomer units containing two or more allyl groups per molecule;

(c3) one or two or more monomers having two or more (meth)acrylate groups per molecule; and (e) one or two or more macromonomers of general formula (C1) and (C2);

[Chem. 4]

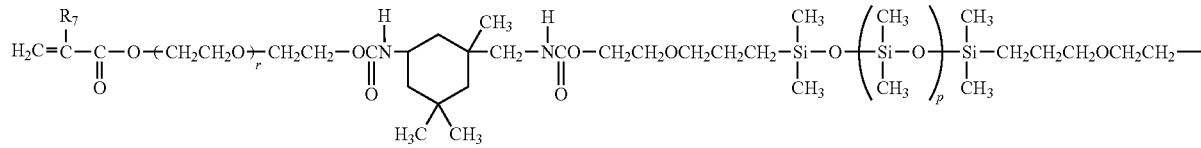

(C1)

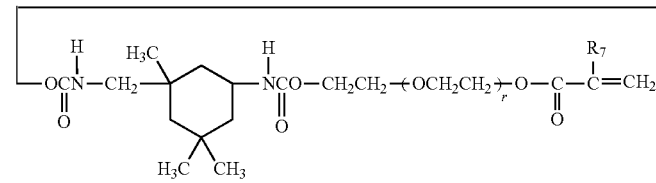

where in formula C1, $R^7$ denotes a hydrogen atom or a methyl group; r denotes 0 to 10; and p denotes 8 to 60;

and where in formula C2, $R^8$ denotes a hydrogen atom or a methyl group, q denotes 9 to 15, and t denotes 0 to 3.

[Chem. 6]

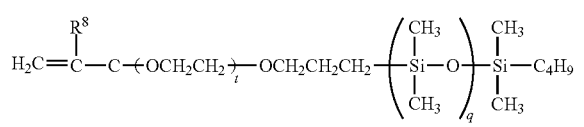
(C2)

17. The silicone-containing copolymer molded article according to claim 16 wherein r is 0 to 8, p is 8 to 50, q is 9 to 13, and t is 0 to 2.

18. The silicone-containing copolymer molded article according to claim 16 wherein the siloxane macromonomer unit denoted by (e) is (E5) or (E6) below:

[Chem. 6]

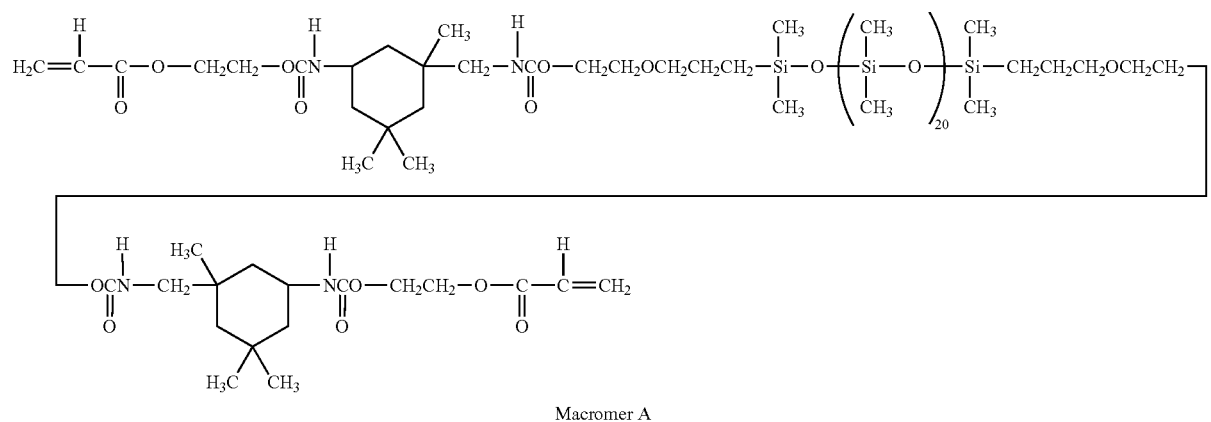
(E5)

Macromer A

[Chem. 7]

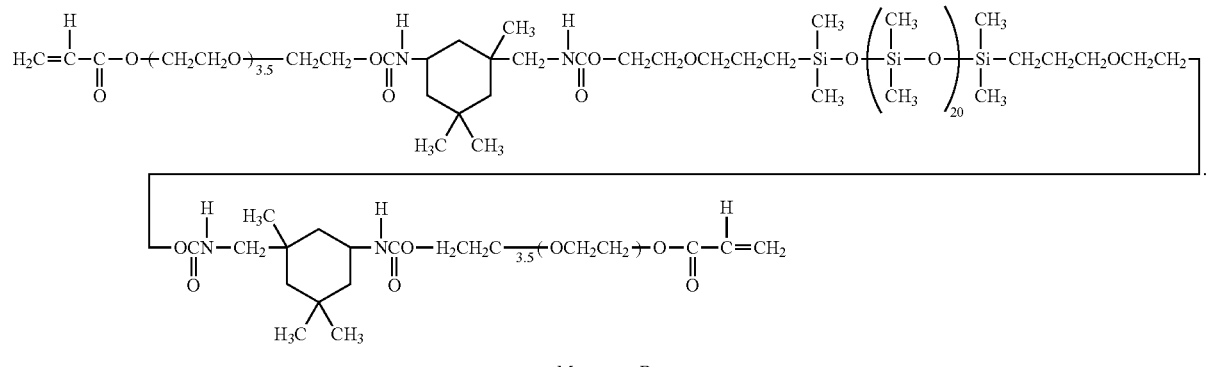
(E6)

Macromer B

19. The silicone-containing copolymer molded article according to claim 15, wherein silicone monomer (a1) is a monomer denoted by general formula (a1-1) or (a1-2):

[Chem. 8]

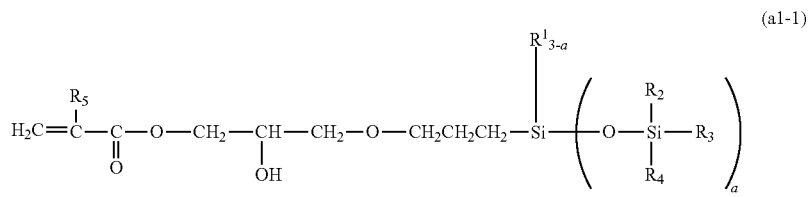
(a1-1)

-continued (a1-2)

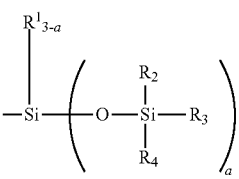

wherein $R^1$, $R^2$, $R^3$, and $R^4$ denotes methyl groups, $R^5$ denotes a hydrogen atom or methyl group, and a denotes an integer of 1 to 3 and silicone monomer (a2) is a monomer denoted by general formula (a2-1) below:

[Chem. 9]

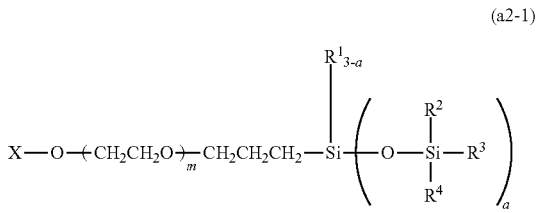
(a2-1)

wherein $R^1$, $R^2$, $R^3$, and $R^4$ denote methyl groups, a denotes an integer of from 1 to 3, m denotes 4 to 8, the X in the equation denotes a substituent selected from the substituents denoted by formulas (Y1) and (Y2) below (wherein $R^5$ denotes a hydrogen atom or a methyl group)):

[Chem. 10]

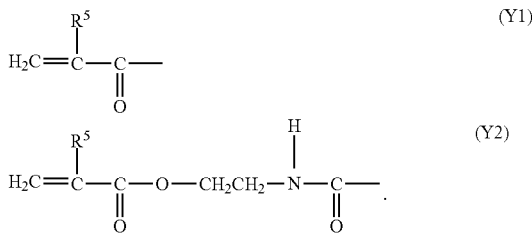

20. The silicone-containing copolymer molded article according to claim 15, wherein hydrophilic monomer (b) is either N-vinyl-2-pyrrolidone or N-vinyl-N-methyl acetamide, or both.

21. The silicone-containing copolymer molded article according to claim 15, wherein monomer (c1) is one or two or more selected from among 1,4-butanediol divinyl ether, diethylene glycol divinyl ether, and triethylene glycol divinyl ether;
   monomer (c2) is one or two or more selected from among triallyl isocyanurate, trimethylol propane diallyl ether, and pentaerythritol triallyl ether; and
   monomer (c3) is one or two or more monomer selected from among ethylene glycol di(meth)acrylate, triethylene glycol di(meth)acrylate, tetraethylene glycol di(meth)acrylate, trimethylol propane tri(meth)acrylate, and ethoxylated trimethylol propane tri(meth)acrylate.

22. The silicone-containing copolymer molded article according to claim 16, wherein the content of silicone monomer (a1) and (a2) units is in a range of 20 to 56 mass %, the content of monomer (b) units is in a range of 40 to 60 mass %, and the content of monomer (c1), (c2), and (c3) units is in a range of 0.02 to 4 mass %.

23. The silicone-containing copolymer molded article according to claim 16, wherein the content of siloxane macromonomer units (e) is 25 mass % or less.

24. The silicone-containing copolymer molded article according to claim 16, further containing at least one additional monomer unit selected from the group of silicone monomer units not containing hydroxyl groups or polyethylene glycol groups in the molecular structure thereof, and monomer units not containing silicon atoms in the molecular structure thereof.

25. The silicone-containing copolymer product of claim 15, wherein the hydrophilic surface with a contact angle relative to pure water of 60° or less is obtained without post-processing the lens-forming material after polymerization to enhance the water wettability of the surface, wherein the contact angle is the contact angle of a silicone hydrogel molded article obtained by hydrating the silicone-containing copolymer molded article.

26. A precursor for silicone hydrogel soft contact lens in the form of the silicone-containing copolymer molded article according to claim 14 and having a contact lens shape.

27. A silicone hydrogel soft contact lens obtained by rendering the silicone hydrogel soft contact lens precursor according to claim 26 a hydrated state with physiological saline or a preservation solution for soft contact lens.

28. The soft contact lens according to claim 27, wherein the hydrated silicone hydrogel soft contact lens exhibits a water content of 35% or greater and less than 60%.

29. The soft contact lens according to claim 27, wherein the hydrated silicone hydrogel soft contact lens is a soft contact lens with a maximum replacement frequency of up to one month.

30. The soft contact lens according to claim 29, wherein the hydrated silicone hydrogel soft contact lens is of a type with a replacement frequency of one day or two weeks.

31. A packaged soft contact lens product wherein the soft contact lens according to claim 27 and physiological saline or soft-contact lens-use preservation solution are contained in a sealed container.

* * * * *